(12) United States Patent
Liu

(10) Patent No.: US 8,733,212 B2
(45) Date of Patent: May 27, 2014

(54) COAXIAL CABLE STRIPPER

(75) Inventor: Jen Kai Liu, New Taipei (TW)

(73) Assignee: Jetool Corp., New Taipei (TW)

( * ) Notice: Subject to any disclaimer, the term of this patent is extended or adjusted under 35 U.S.C. 154(b) by 202 days.

(21) Appl. No.: 13/466,144

(22) Filed: May 8, 2012

(65) Prior Publication Data
US 2013/0007964 A1 Jan. 10, 2013

(30) Foreign Application Priority Data
Jul. 6, 2011 (TW) .............................. 100212337 U

(51) Int. Cl.
*B25F 1/00* (2006.01)
*H02G 1/12* (2006.01)

(52) U.S. Cl.
CPC ................ *H02G 1/1224* (2013.01); *B25F 1/00* (2013.01)
USPC .................................................. 81/9.4; 7/107

(58) Field of Classification Search
CPC .......... H02G 1/12; H02G 1/1224; B25F 1/00; B25F 1/02
USPC .......................................... 81/9.4; 7/107, 158
See application file for complete search history.

(56) References Cited

U.S. PATENT DOCUMENTS

| | | | |
|---|---|---|---|
| 7,003,883 B2* | 2/2006 | Tapper ........................... | 30/90.1 |
| 7,025,239 B2* | 4/2006 | Itano et al. ........................ | 225/95 |
| 7,216,431 B2* | 5/2007 | Holliday et al. ............... | 30/90.7 |
| 8,621,961 B2* | 1/2014 | Burch et al. ..................... | 81/9.4 |
| 2011/0056026 A1* | 3/2011 | Lin .................... | 7/107 |
| 2012/0079663 A1* | 4/2012 | Willard et al. .................... | 7/107 |
| 2013/0031728 A1* | 2/2013 | Yen .................... | 7/107 |

\* cited by examiner

Primary Examiner — David B Thomas

(57) ABSTRACT

A coaxial cable stripper is provided with the functionality of adjusting the depth of cuts made by the cutting component thereof. Therefore, the coaxial cable stripper can adjust the depth of cut depends on the need of a user. The coaxial cable stripper can also cutoff the first insulating layer and the second insulating layer of a coaxial cable.

20 Claims, 30 Drawing Sheets

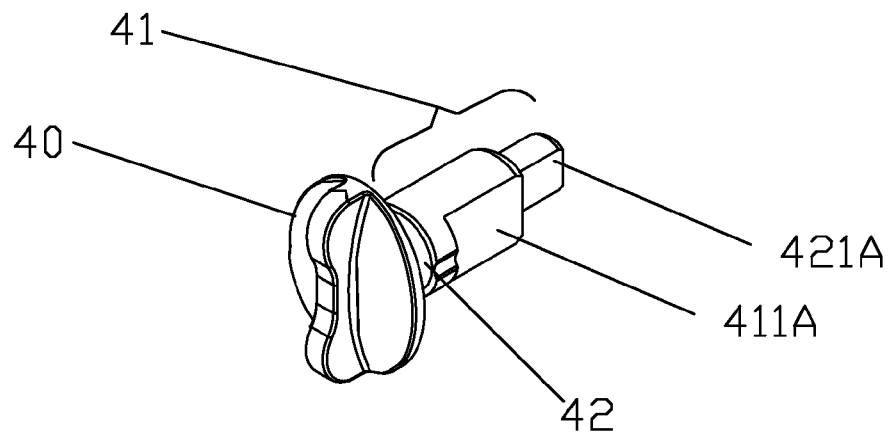
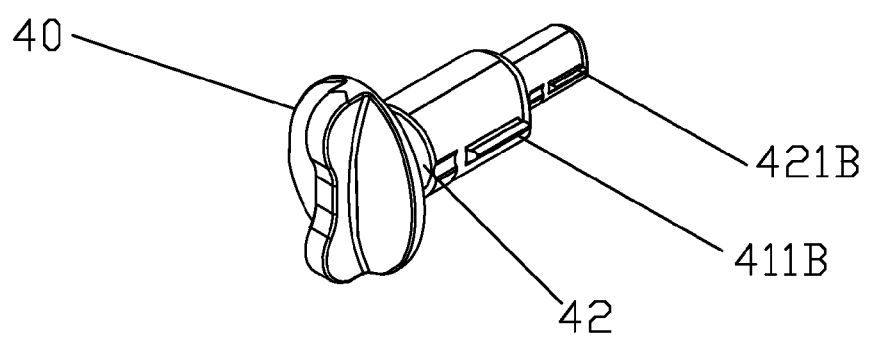
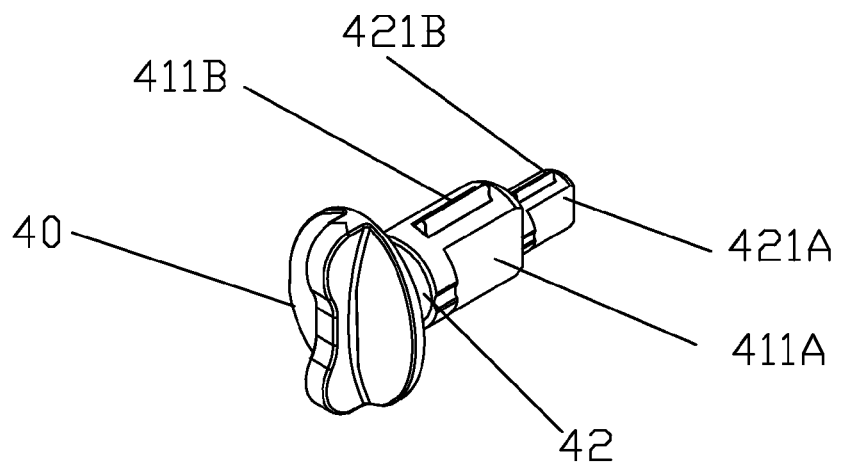
FIG. 37

COAXIAL CABLE STRIPPER

BACKGROUND OF THE INVENTION

1. Field of the Invention

The invention relates to coaxial cable strippers and more particularly to a coaxial cable stripper of the type that is equipped with functionality which can adjust depth of cuts, and cut off of both individual insulating layers of a coaxial cable.

2. Description of Related Art

In order to cut the double layers of insulating material off of a coaxial cable, the traditional method is as follows:

Directly utilize sharp blade to cutoff both the insulating layers of a coaxial cable. Individually cut the double layers off of insulating material off of a coaxial cable via a sharp blade of a clamp.

The disadvantages of these two types of implementation are that the coaxial cable risks being cut apart, stripped a part, or deformed due to improper operations by users.

Due to the fact that the market demand is very high in terms of cutting the double layer of insulating material off of coaxial cables, inventors have been developing tools that will improve the aforementioned disadvantages. There are already two prior art that perform these aforementioned implementations. The theory of cutoff in both of these patents is via two cutting components of a coaxial cable stripper by first tightly clamp down a coaxial cable at the coaxial cable stripper, followed by rotating the coaxial cable or the coaxial cable stripper, then utilize the two cutting components on the coaxial cable stripper to individually cut the double layers of insulating material off of the coaxial cable. Upon further inspection, although the two aforementioned patents can achieve the cutoff functionality of the double layers of insulating material of a coaxial cable, the depth of cut is a fixated value due to the two cutting components utilized by the coaxial cable stripper. Therefore, the tool is only useful for a given unchangeable coaxial cable specification. If the goal is to cutoff a different coaxial of different specification, the cutting component must be exchanged or replaced. This special requirement will bring inconveniences to a user especially during portable applications.

Bearing above conventional drawbacks in mind, a novel coaxial cable stripper having the ability of varying depth of cut is finally developed.

SUMMARY OF THE INVENTION

It is therefore one object of the invention to provide a coaxial cable stripper which is applicable for cutting coaxial cable; furthermore, the cutting component on the coaxial cable stripper is capable of adjusting the depth of cuts. The coaxial cable stripper comprises a main body, a first spring, a shaft body, and a rotatable, displaceable part. Wherein the main body has a first hollow structure, one receptacle is disposed at one end of the main body, the receptacle is interconnected with the first hollow structure, a first guide hole is disposed on one side of the receptacle, a second guide hole is disposed on the other side of the receptacle, a first hole and an eighth hole are disposed adjacent to the receptacle; the first spring is disposed within the first hollow structure; the shaft body passes through the receptacle and is placed within the first hollow structure, the first spring is disposed between the shaft body and the first hollow structure; moreover, the first spring pushes the shaft body and the first hollow structure, a through hole for rod is disposed at the shaft body, a rod first passes through the first guide hole then passes through the through hole for rod and finally enters into the second guide hole, a third hole is disposed at the shaft body, a first gap and a second gap are disposed within the third hole, a fifth hole is disposed at one side of the shaft body, a first blade guide groove and a first blade seat are disposed within the shaft body, a first blade and a first polygonal hole are disposed at the first blade seat, the first blade seat is disposed at the first blade guide groove, moreover, the first blade seat can move on the first blade guide groove, the first blade guide groove leads the first blade to displace on the first blade seat, the first blade may protrude outside of the first gap, a second spring is disposed within the shaft body, the second spring is disposed between the first blade seat and the shaft body, furthermore, the second spring pushes simultaneously against the first blade seat and the shaft body, a second blade is disposed at the shaft body and the second blade may protrude outside of the second gap; an extension is disposed at the rotatable, displaceable part, a first polygonal cylinder is disposed at the extension, the first polygonal cylinder can rotate inside the first polygonal hole, the extension passes first through the eighth hole then through the fifth hole and finally into the first polygonal hole.

The shaft body also comprises a second blade seat which is equipped with the second blade and a second polygonal hole, the second blade seat is installed at the second blade guide groove, moreover, the second blade seat is movable at the second blade guide groove, the second blade guide groove guides the second blade to displace on the second blade seat, a third spring is installed between the second blade seat and the shaft body, moreover, the third spring simultaneously pushes against the second blade seat and the shaft body; the extension comprises: a second polygonal cylinder; rotation made by rotatable, displaceable part leads the second polygonal cylinder to rotate inside the second polygonal hole, the second polygonal cylinder provides adjustments to various edges of the second polygonal cylinder which push against the second polygonal hole, subsequently leading the second blade seat to displace along the second blade guide groove, hence, to adjust the height of the second blade at the second blade seat that protrudes outside of the second gap.

Theory behind adjusting a cutting component to produce variable depth of cut: Rotate the rotatable, displaceable part causes the first polygonal cylinder to rotate inside the first polygonal hole, subsequently, various edges of the first polygonal cylinder will push against the first polygonal hole, leading the first blade seat to displace along the first blade guide groove, hence, resulting in making adjustment to the height of the first blade at the first blade seat that protrudes outside of the first gap; and/or rotate the rotatable, displaceable part causes the second polygonal cylinder to rotate inside the second polygonal hole, subsequently, various edges of the second polygonal cylinder will push against the second polygonal hole, this action leads the second blade seat to displace along the second blade guide groove, resulting in making adjustment to the height of the second blade at the second blade seat that protrudes outside of the second gap.

Following is the theory of variable depth of cut utilizing the first blade and the second blade:

The height of the first blade that protrudes outside of the first gap A1 for example: H2 or H3 is different from the height of the second blade that protrudes outside of the second gap A2 for example: Hence, two different depths of cuts can be simultaneously against the coaxial cable.

Following is the theory of cutting a coaxial cable:

Rotate the rotatable and displaceable part causes the first polygonal cylinder to rotate inside the first polygonal hole, subsequently, various edges of the first polygonal cylinder will push against the first polygonal hole, leading the first blade seat to displace along the first blade guide groove, hence, resulting in making adjustment to the height of the first blade at the first blade seat that protrudes outside of the first gap.

When a thrust F is applied to the shaft body of the coaxial cable stripper, the thrust F will compress the first spring. The guidance of the first guide hole and the second guide hole along the rod causes the shaft body to displace towards the direction of the hollow structure; hence, the movement leads the third hole to displace towards the hollow structure. A coaxial cable can be placed within the third hole of the coaxial cable stripper once the third hole overlaps with the first hole.

Stress at the shaft body is relieved once thrust F is removed. When that happens, the first spring will be automatically trending back to its original position. In addition, the shaft body will be guided by the first guide hole and the second guide hole at the rod and be pushed away from the hollow structure the blockage from the rod will not allow the shaft body and the hollow structure to completely separate. At this moment, the coaxial cable being placed in the third hole will be clamped tightly inside the third hole while the first blade and the second blade will make their cuts into the coaxial cable.

The coaxial cable is held securely because of the difference in depth made by the cuts coming from the first blade and the second cut, and following by rotating the coaxial cable stripper or secure the coaxial cable stripper and follow by rotating the coaxial cable, the first insulating layer and the second insulating layer will therefore be cut off.

The above and other objects, features and advantages of the invention will become apparent from the following detailed description taken with the accompanying drawings.

BRIEF DESCRIPTION OF THE DRAWINGS

FIG. 37 shows the rotatable, displaceable part of the coaxial cable stripper shown in different structural shapes;

DETAILED DESCRIPTION OF THE INVENTION

Figure 1:
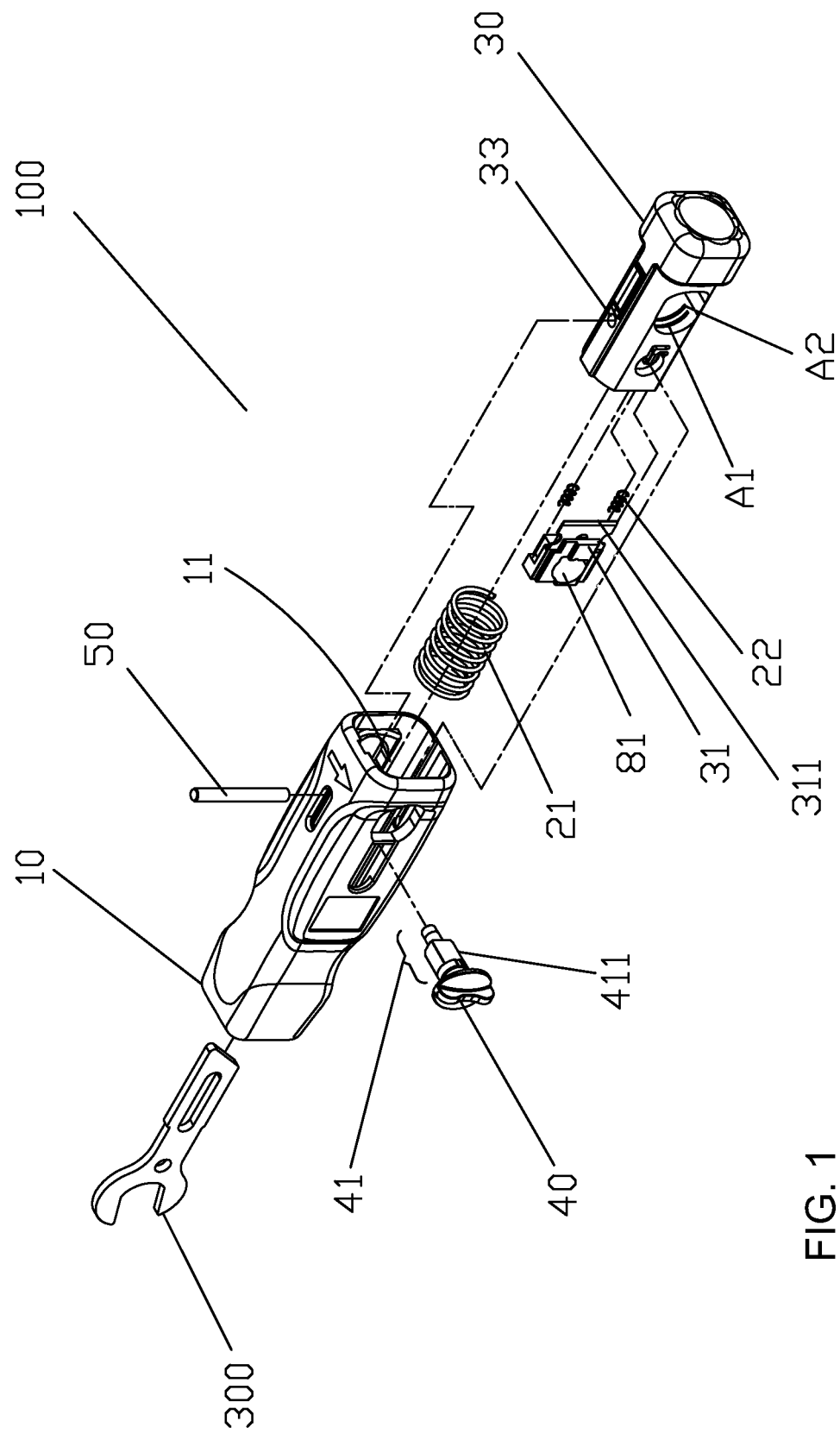
FIG. 1 is an exploded view of a coaxial cable stripper of the invention showing the connections between all components of the coaxial cable stripper.
Figure 2:
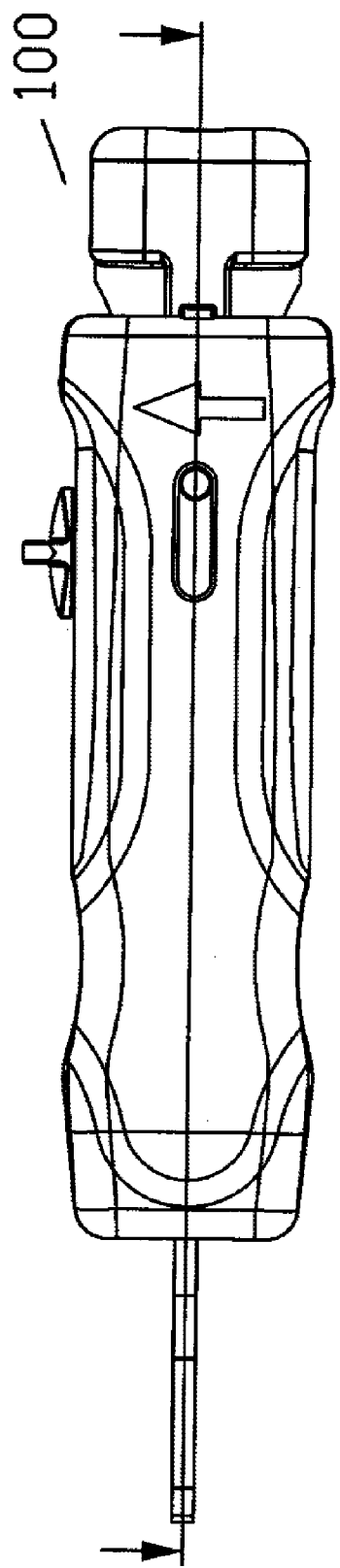
FIG. 2 is a cutaway view of the coaxial cable stripper.
Figure 3:
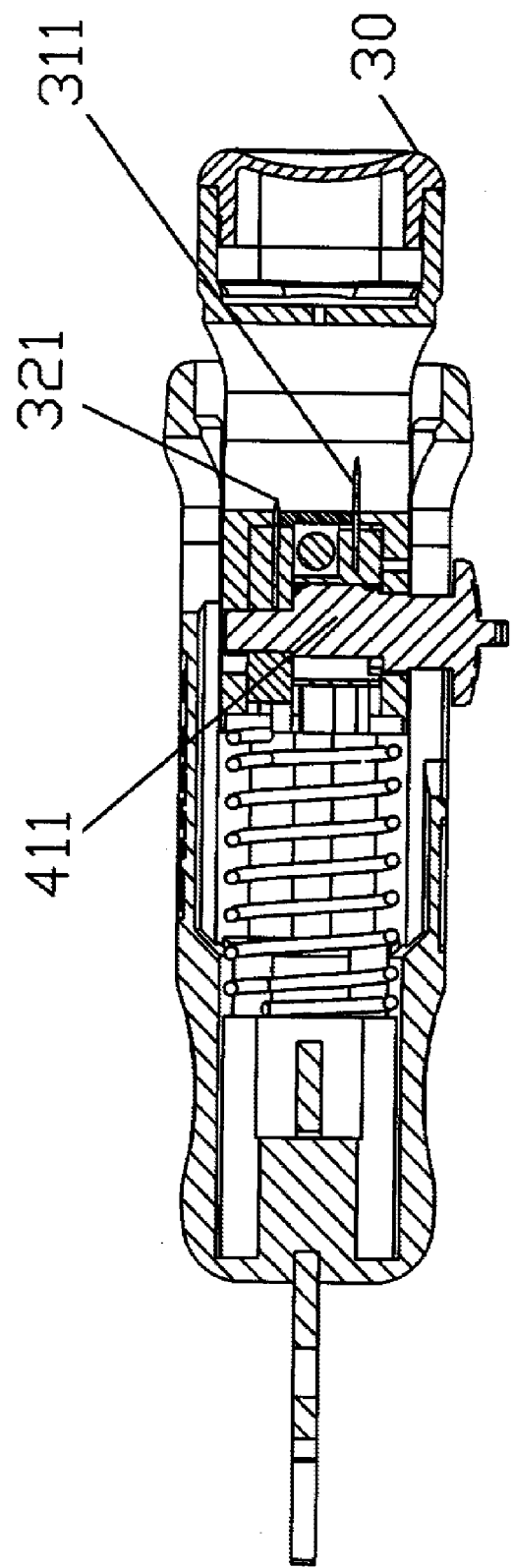
FIG. 3 is a cutaway view of the coaxial cable stripper as shown in FIG. 2 showing the second blade installed at the shaft body.
Figure 4:
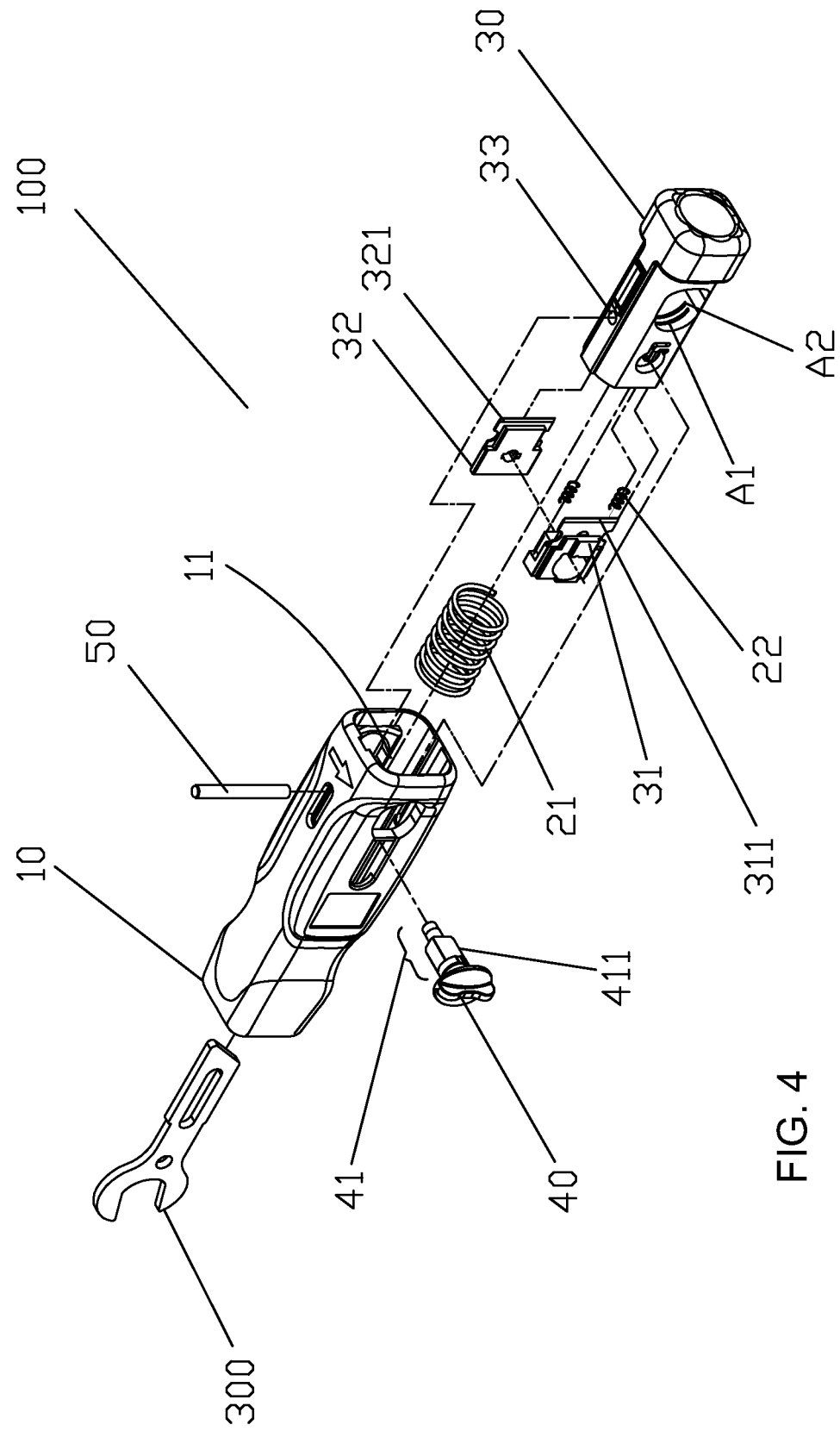
FIG. 4 is an exploded view of another version of the coaxial cable stripper showing the connections between all components of the coaxial cable stripper.
Figure 5:
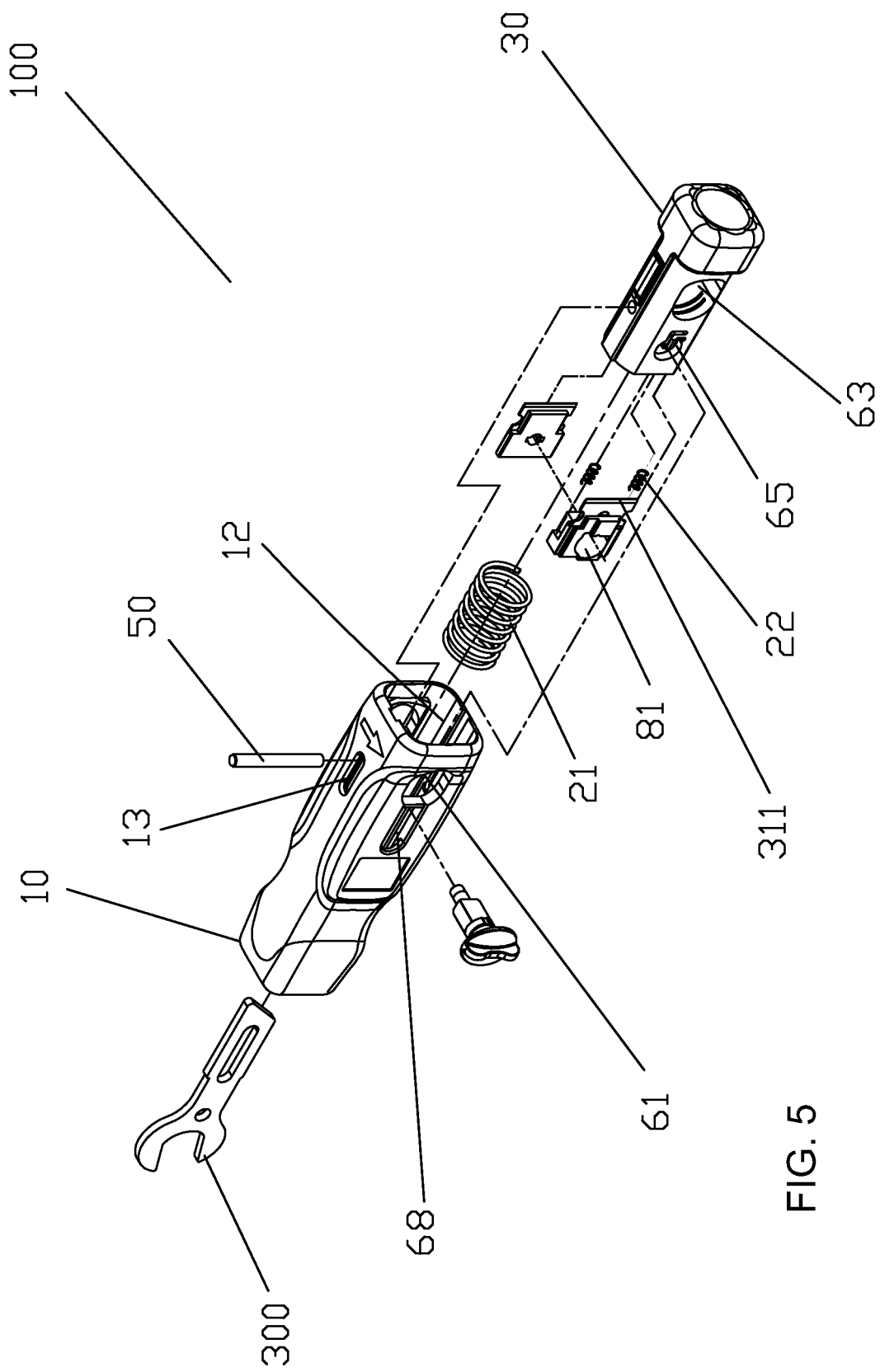
FIG. 5 is an exploded view of another version of the coaxial cable stripper showing the connections between all components of the coaxial cable stripper.
Figure 6:
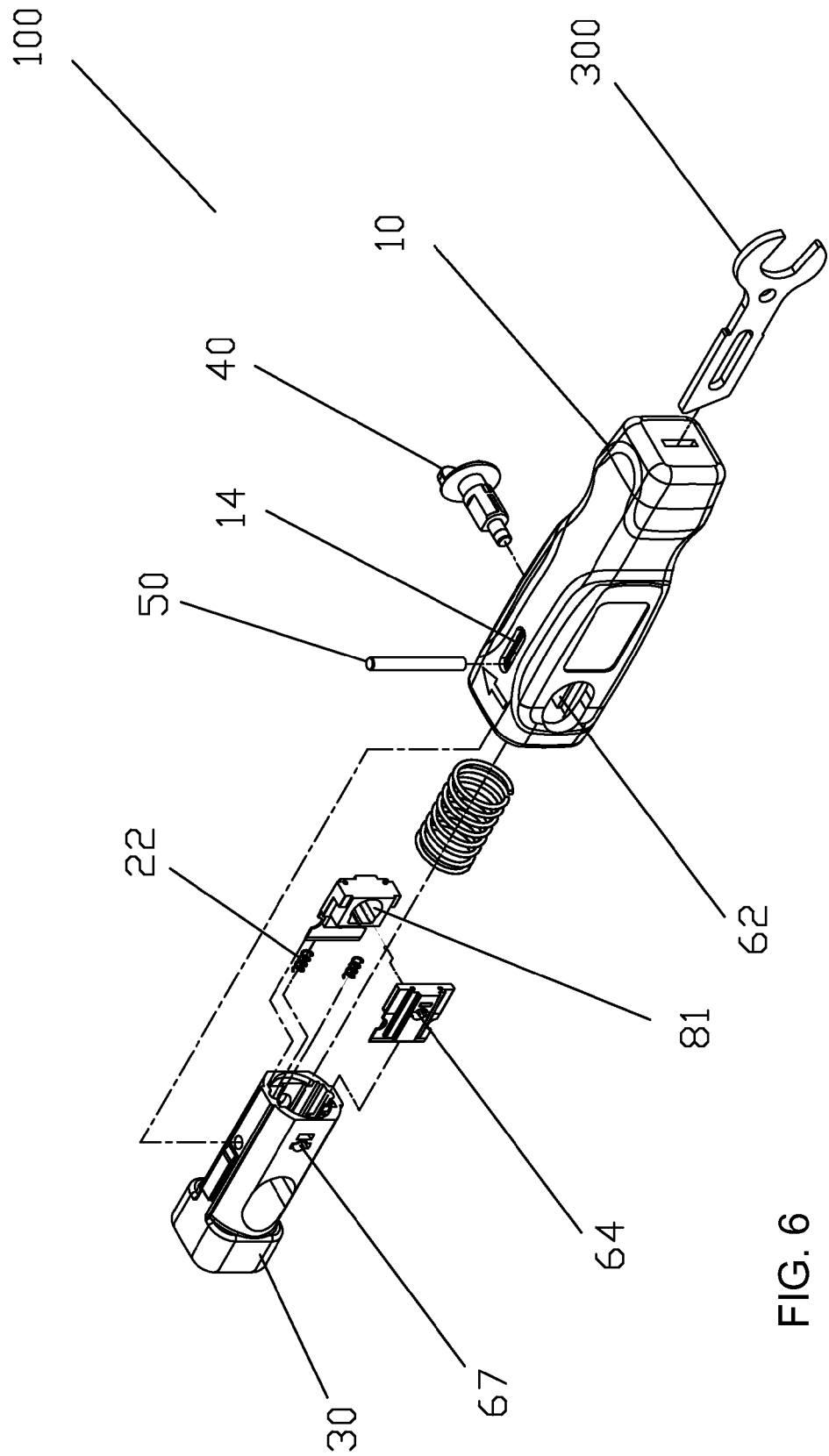
FIG. 6 is an exploded view of another version of the coaxial cable stripper being viewed from a different angle, it showing the connections between all components of the coaxial cable stripper.
Figure 7:
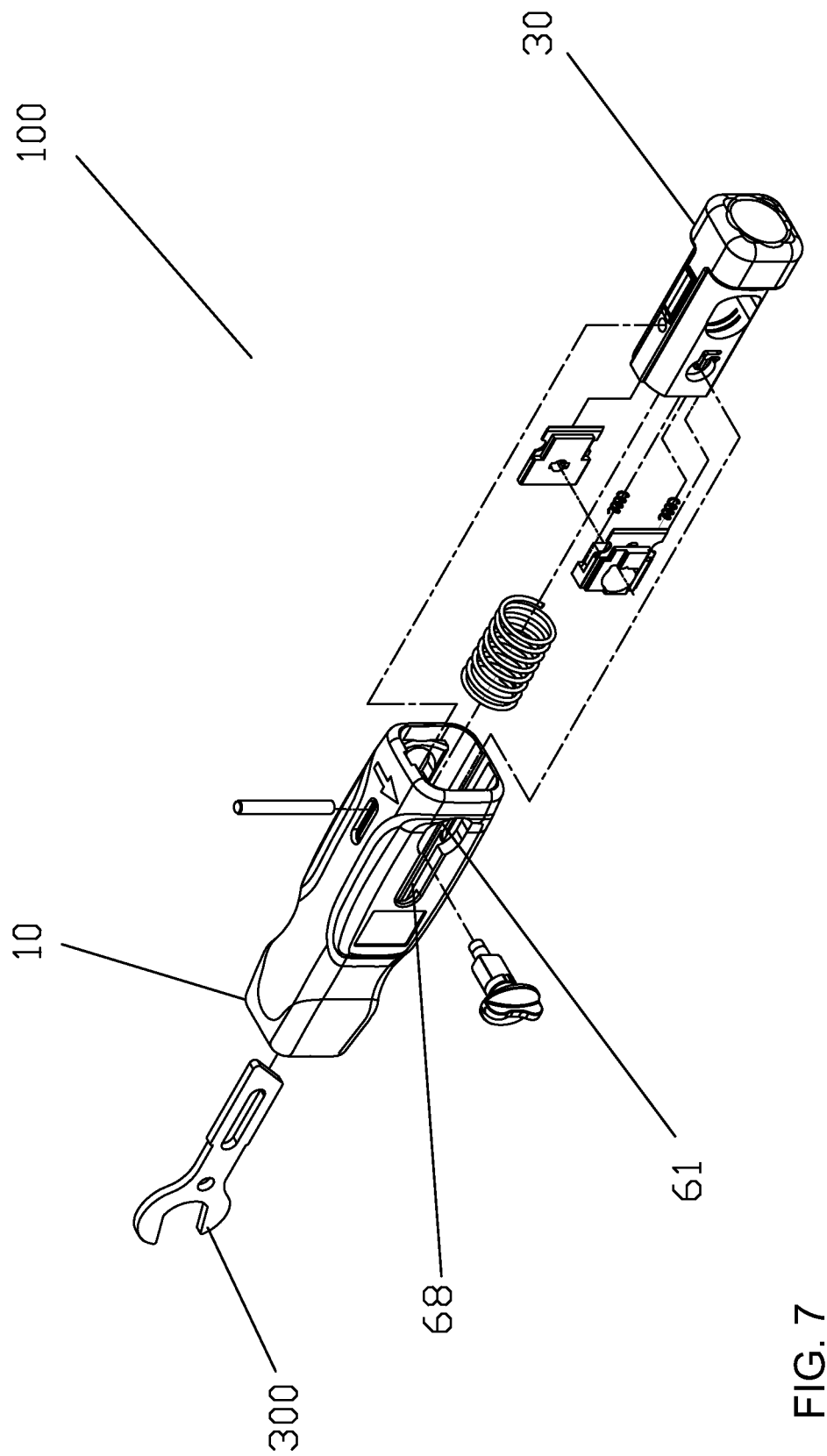
FIG. 7 is an exploded view of another version of the coaxial cable stripper showing the first hole and the interconnected eighth hole.
Figure 8:
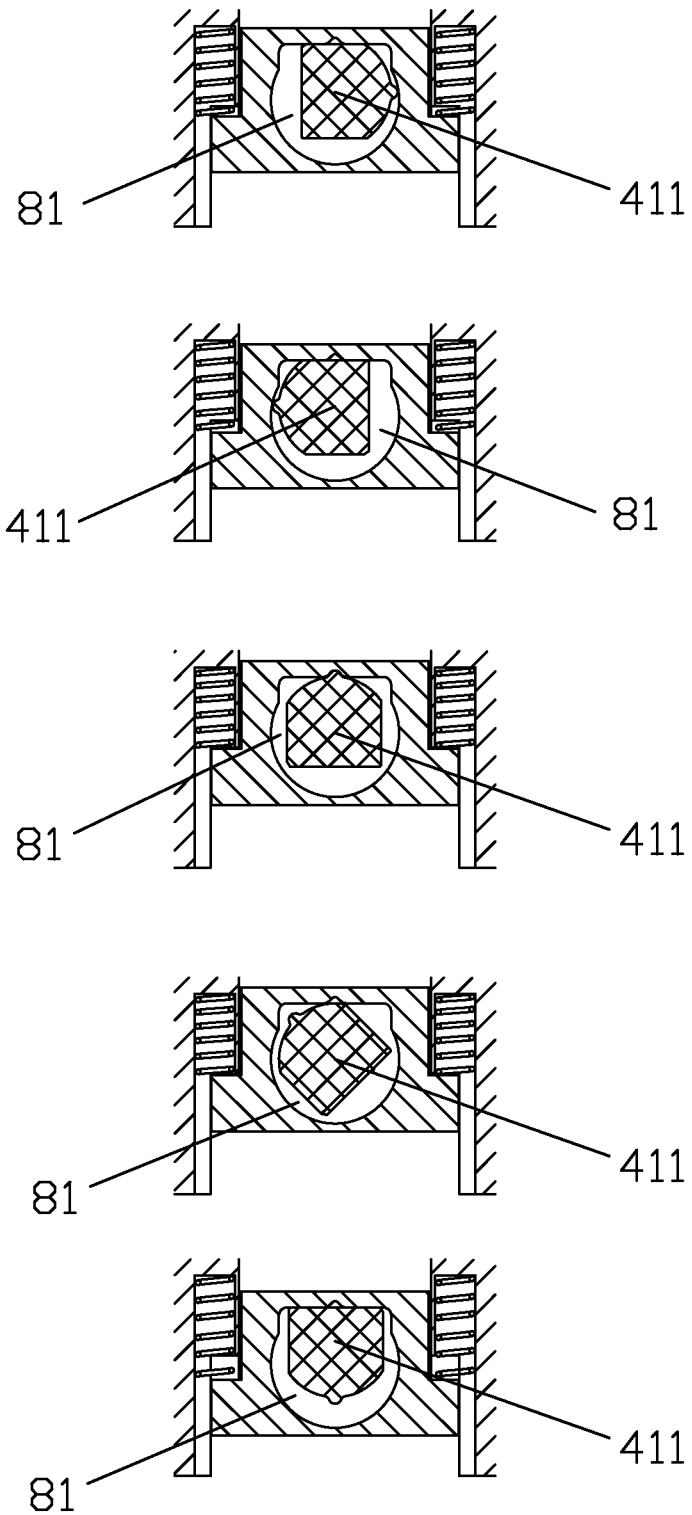
FIG. 8 shows how rotation of the first polygonal cylinder takes place inside the first polygonal hole, and how various edges of the first polygonal cylinder will push against the first polygonal hole during the rotation.
Figure 9:
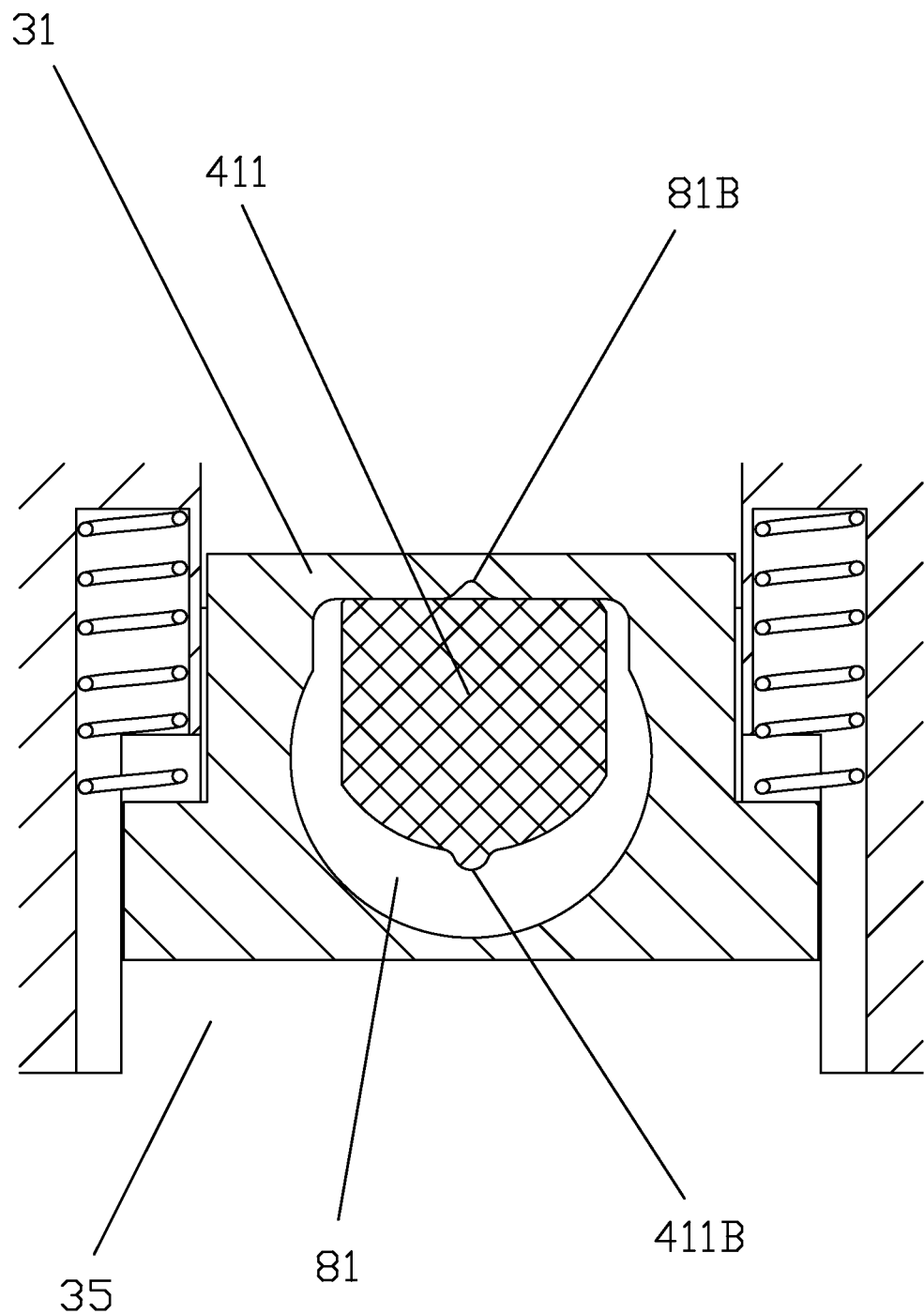
FIG. 9 shows the first flat surface of the first polygonal cylinder pushing against the first polygonal hole.
Figure 10:
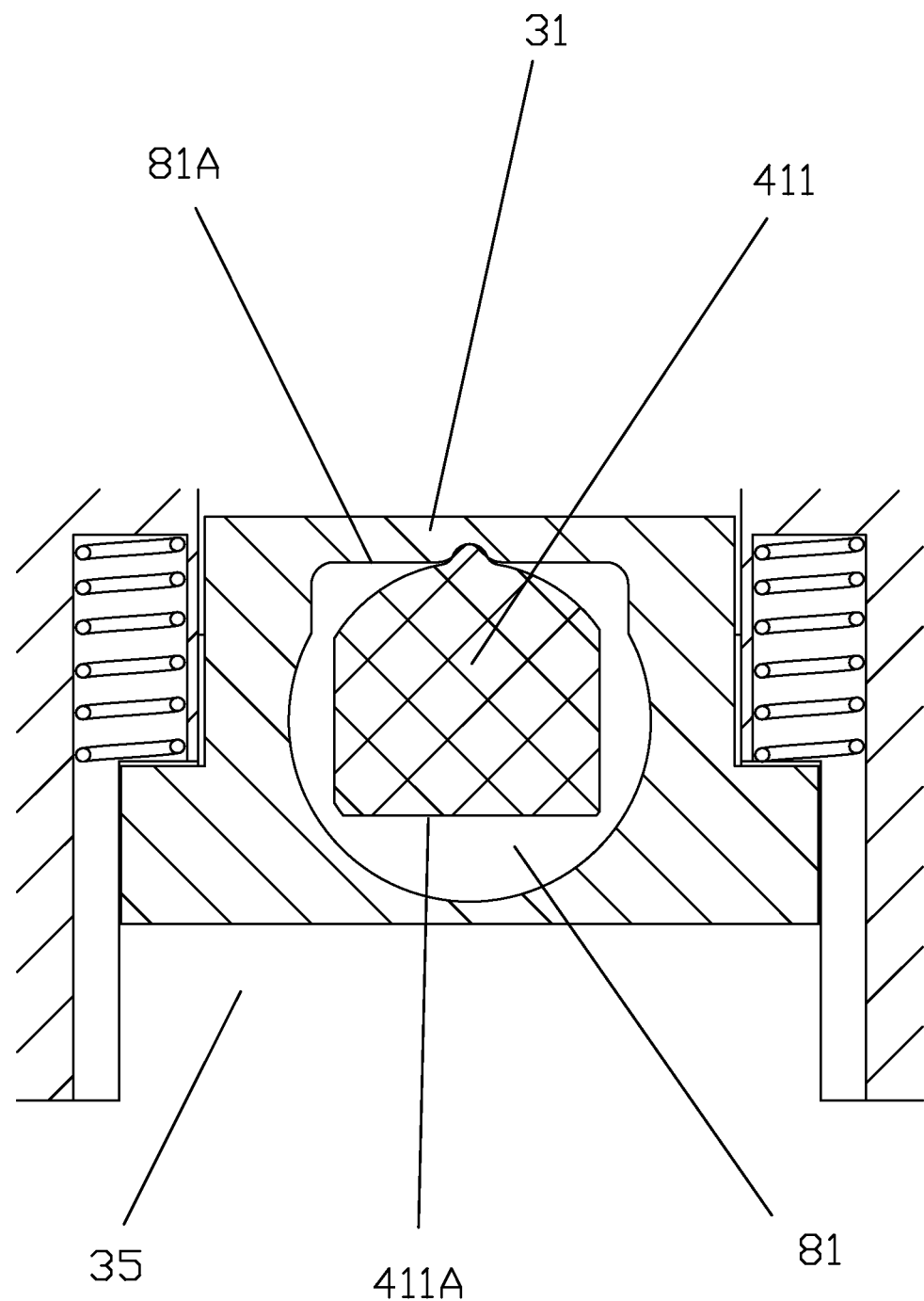
FIG. 10 shows the first protrusion of the first polygonal cylinder and how the first protrusion pushes against the first positioning slot.
Figure 11:
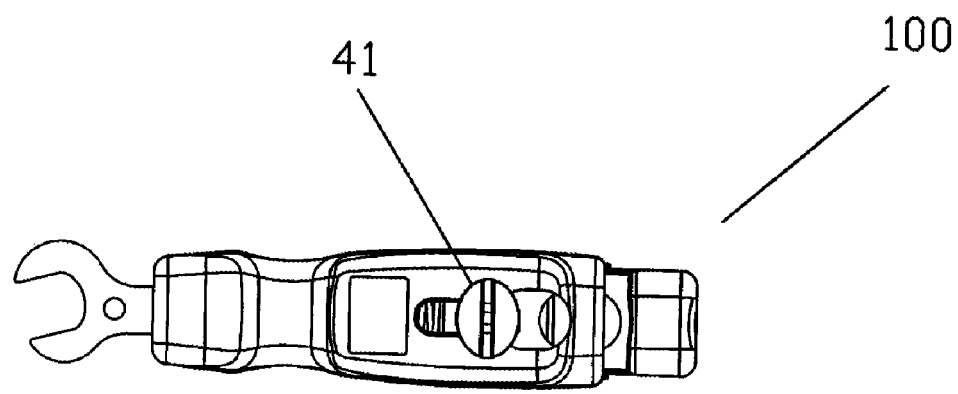
FIG. 11 is a top view of the coaxial cable stripper showing a rotatable, displaceable part which is being set at 0 degree.
Figure 12:
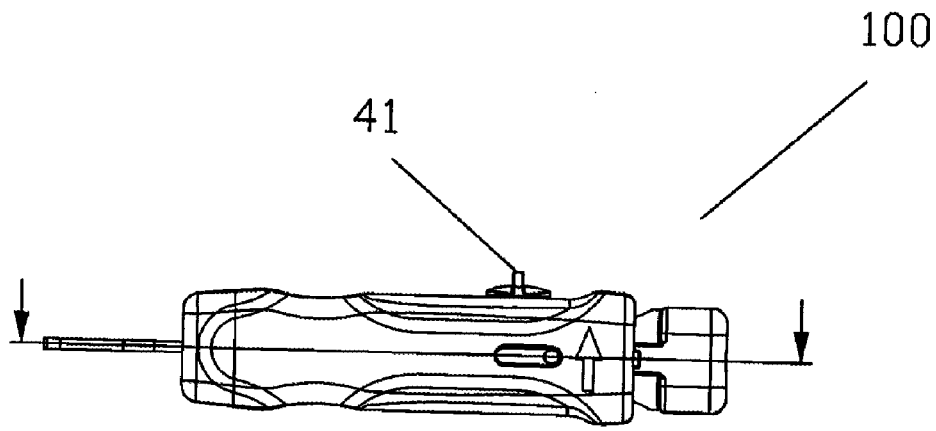
FIG. 12 is a cutaway view of the coaxial cable stripper as shown in FIG. 11.
Figure 13:
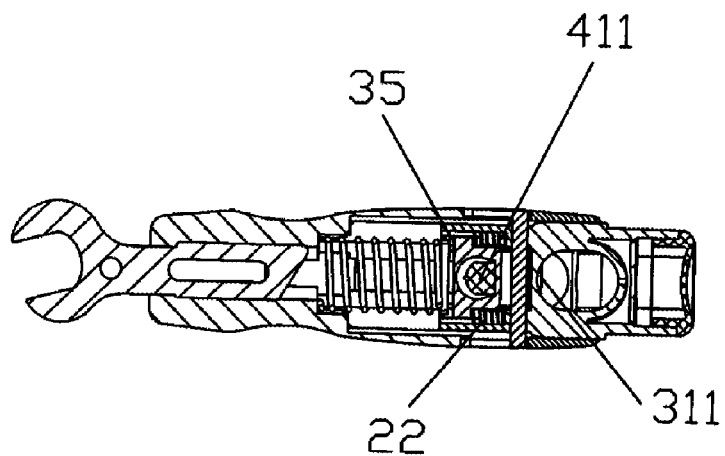
FIG. 13 is a cutaway view of the coaxial cable stripper as shown in FIG. 12 showing the first flat surface of first polygonal cylinder pushing against the third surface of the first polygonal hole, and how the first blade is protruded outside of the first gap.
Figure 14:
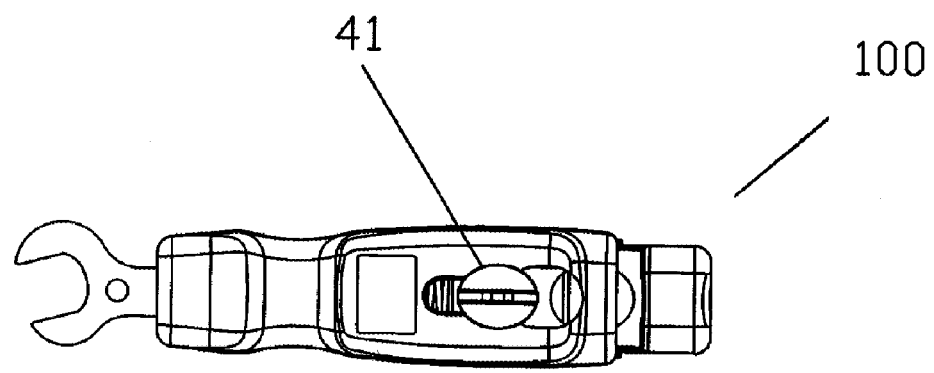
FIG. 14 is a top view of the coaxial cable stripper showing the rotatable, displaceable part which is being set at 90 degree.
Figure 15:
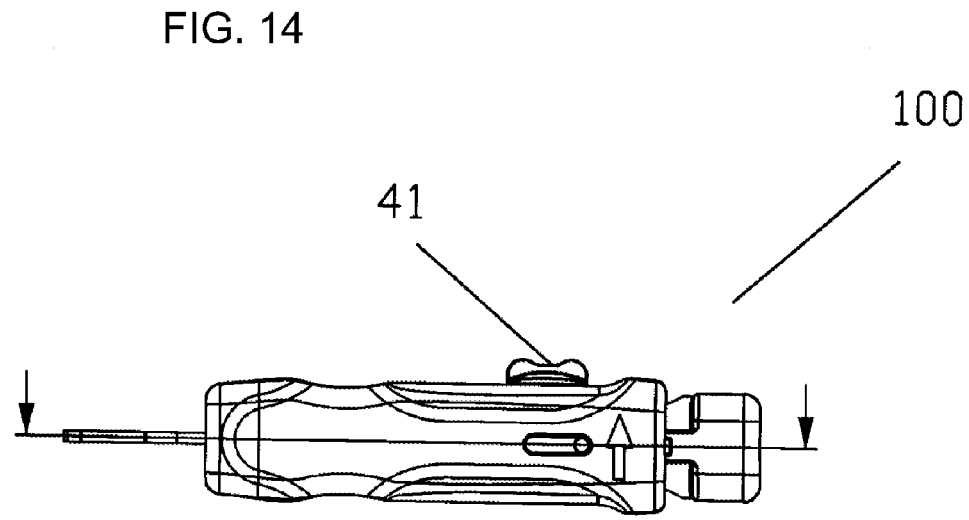
FIG. 15 is a cutaway view of the coaxial cable stripper as shown in FIG. 14.
Figure 16:
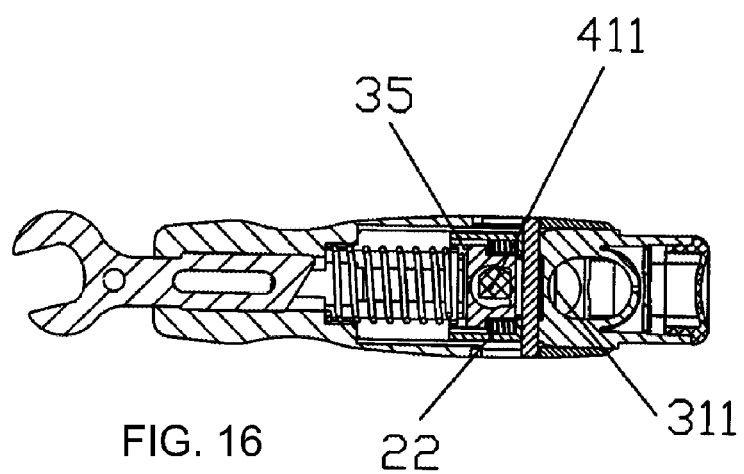
FIG. 16 is a cutaway view of FIG. 15 showing the other first flat surface of the first polygonal cylinder pushing against the third flat surface of the first polygonal hole, and the first blade protruding outside the first gap; also, the amount of protrusion shown in FIG. 16, made by first blade and first gap, is greater than what is in FIG. 13.
Figure 17:
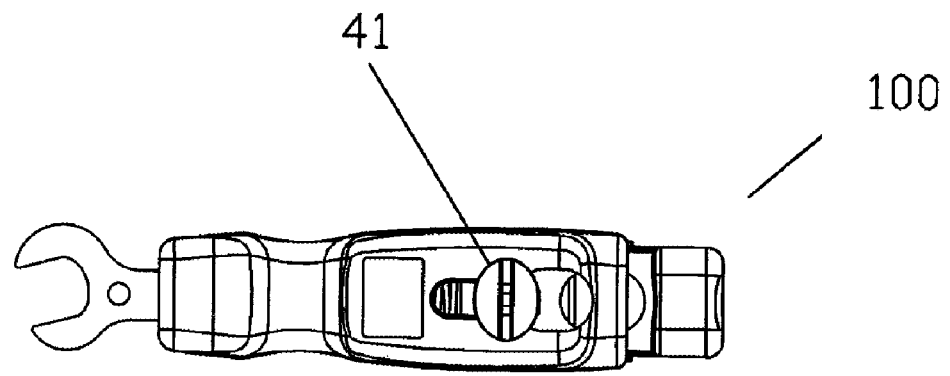
FIG. 17 is a top view of the coaxial cable stripper showing the rotatable, displaceable part which is being set at 180 degree.
Figure 18:
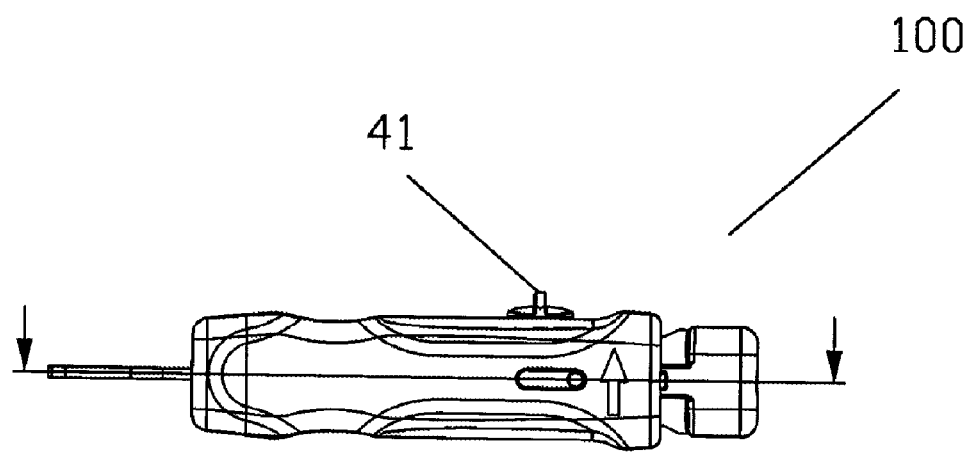
FIG. 18 is a side view of the coaxial cable stripper as shown in FIG. 17.
Figure 19:
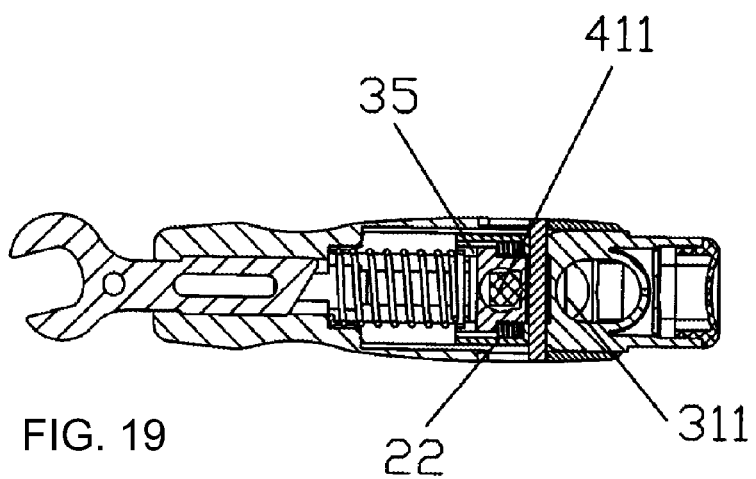
FIG. 19 is a cutaway view of the coaxial cable stripper as shown in FIG. 18 showing the first protrusion of the first polygonal cylinder positioned at the first positioning slot of the first polygonal hole and is pushing against the first polygonal hole, also, the amount of protrusion shown in FIG. 19, made by first blade and first gap, is greater than what is in FIG. 13.
Figure 20:
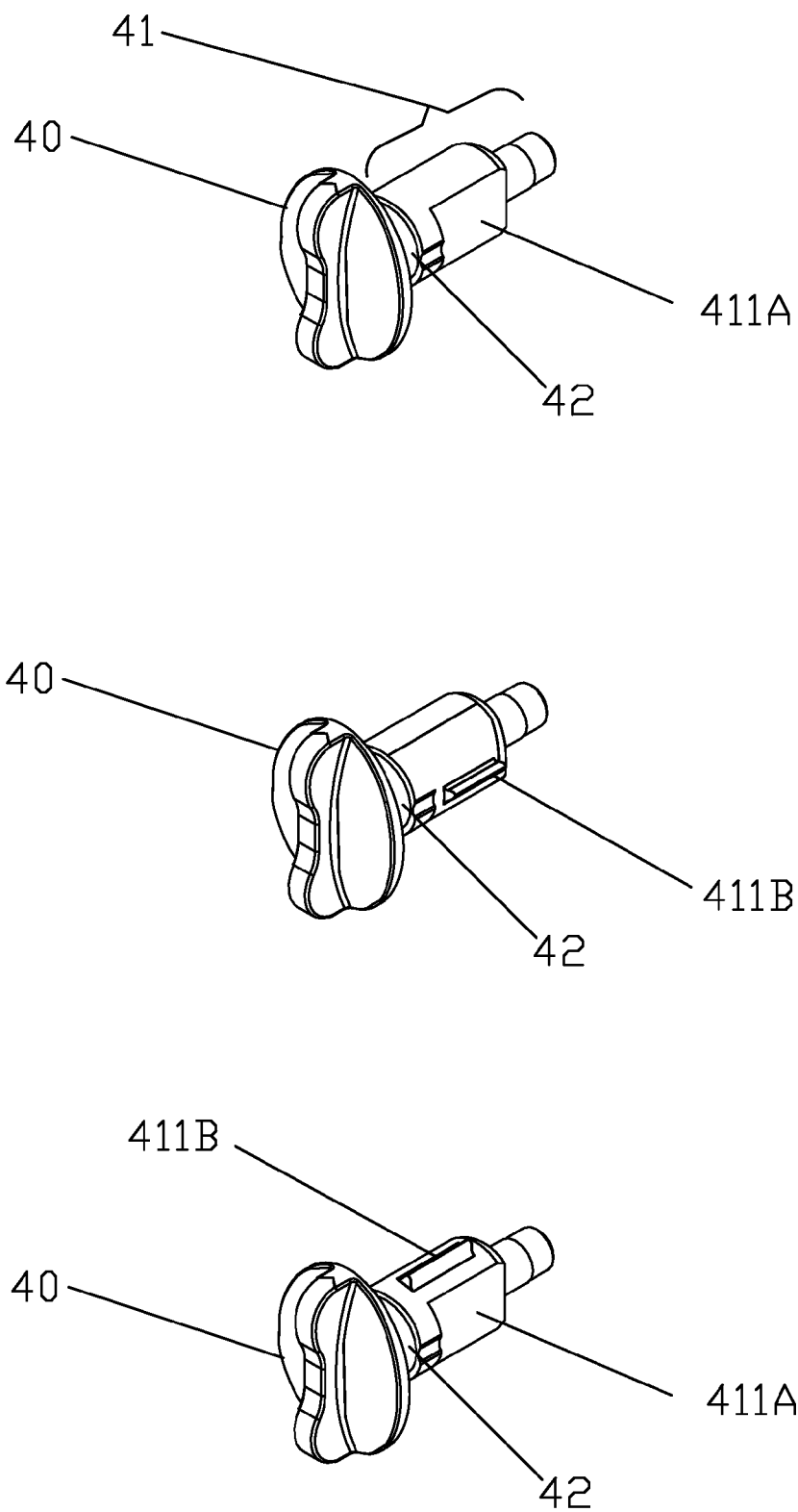
FIG. 20 shows the rotatable, displaceable part of the coaxial cable stripper shown in different structural shapes.
Figure 21:
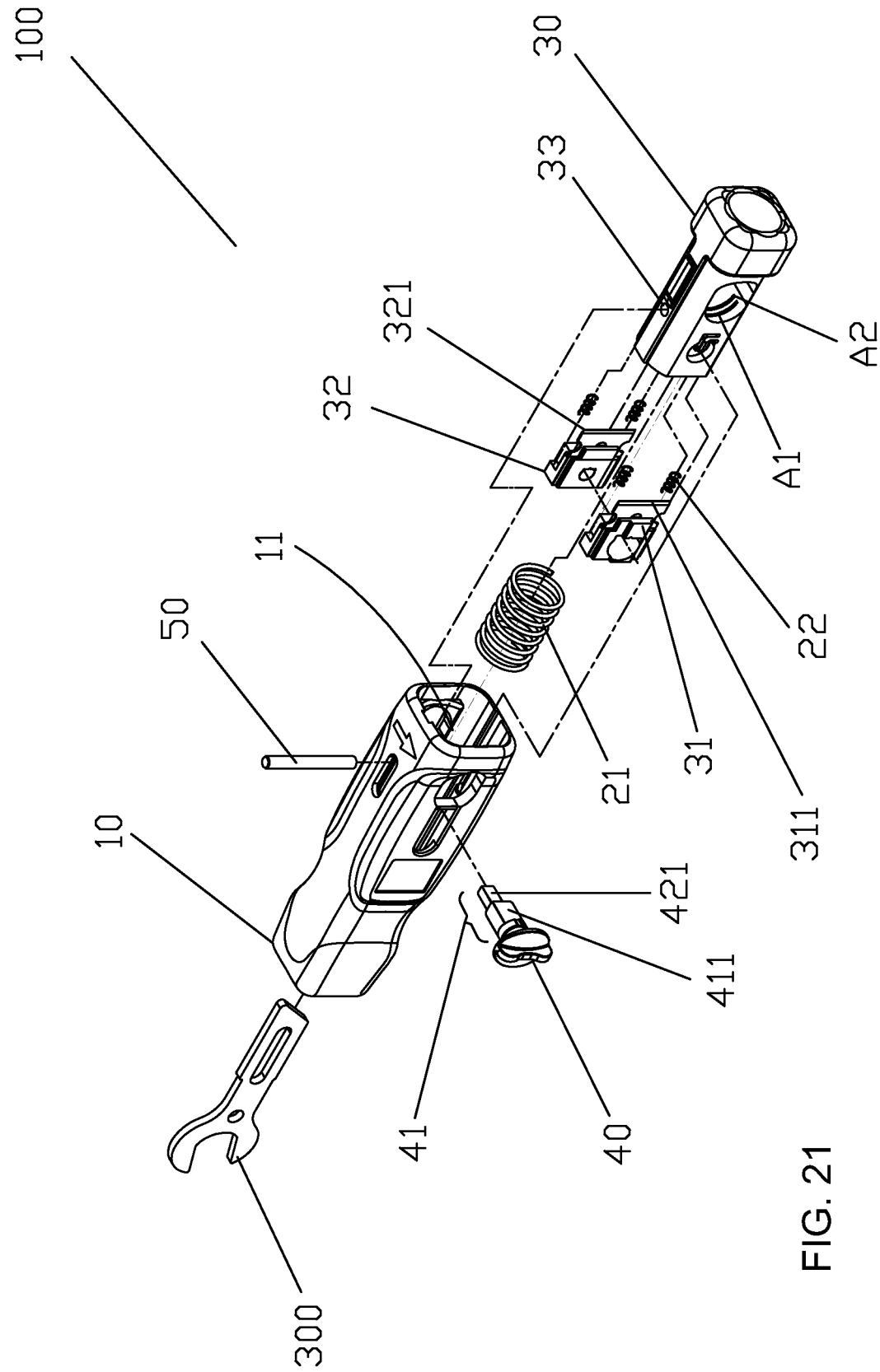
FIG. 21 is an exploded view of another version of the coaxial cable stripper showing the connections between all components of the coaxial cable stripper.
Figure 22:
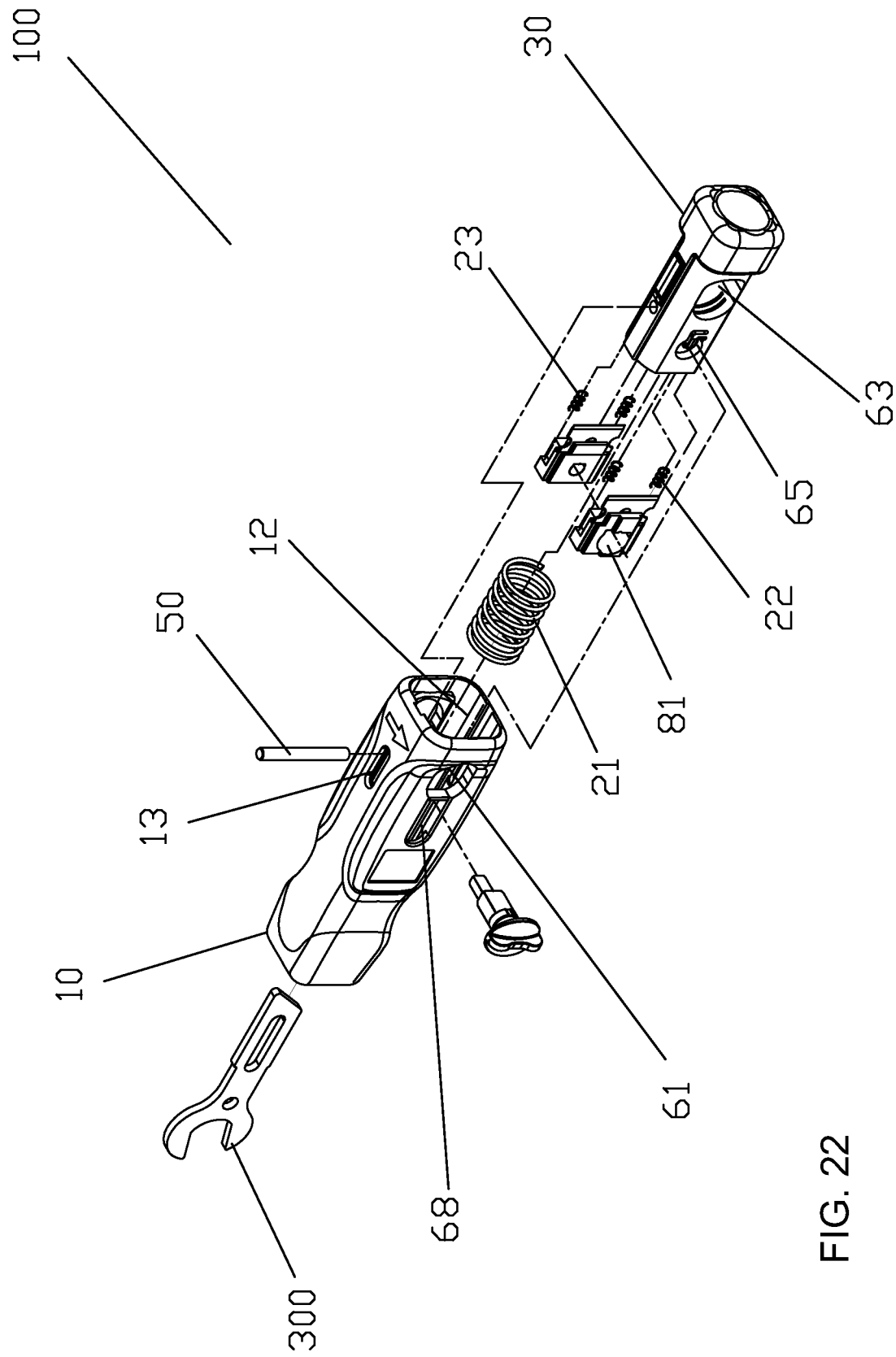
FIG. 22 is an exploded view of another version of the coaxial cable stripper showing the connections between all components of the coaxial cable stripper.
Figure 23:
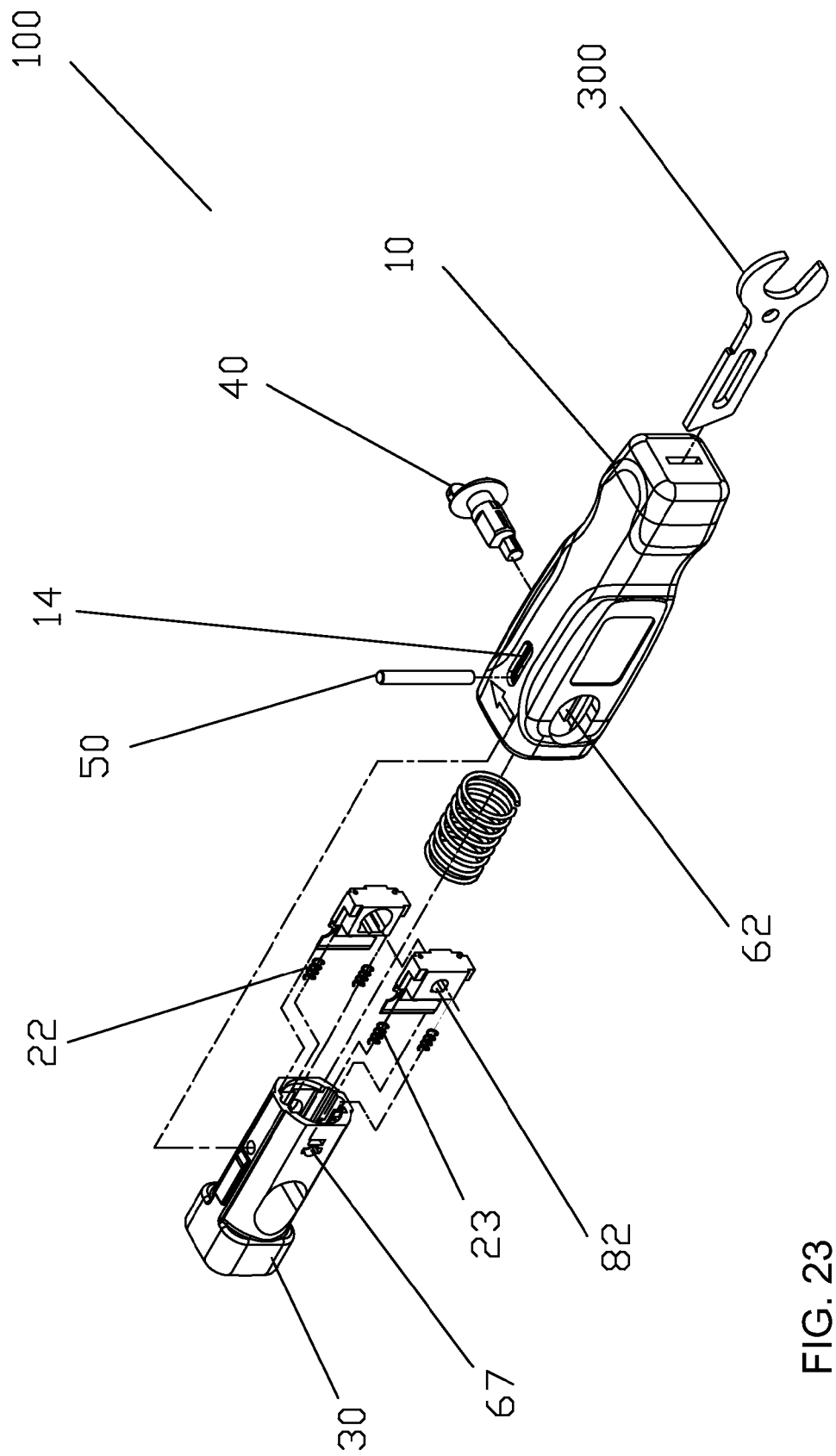
FIG. 23 is an exploded view of another version of the coaxial cable stripper being viewed at a different angle showing the connections between all components of the coaxial cable stripper.
Figure 24:
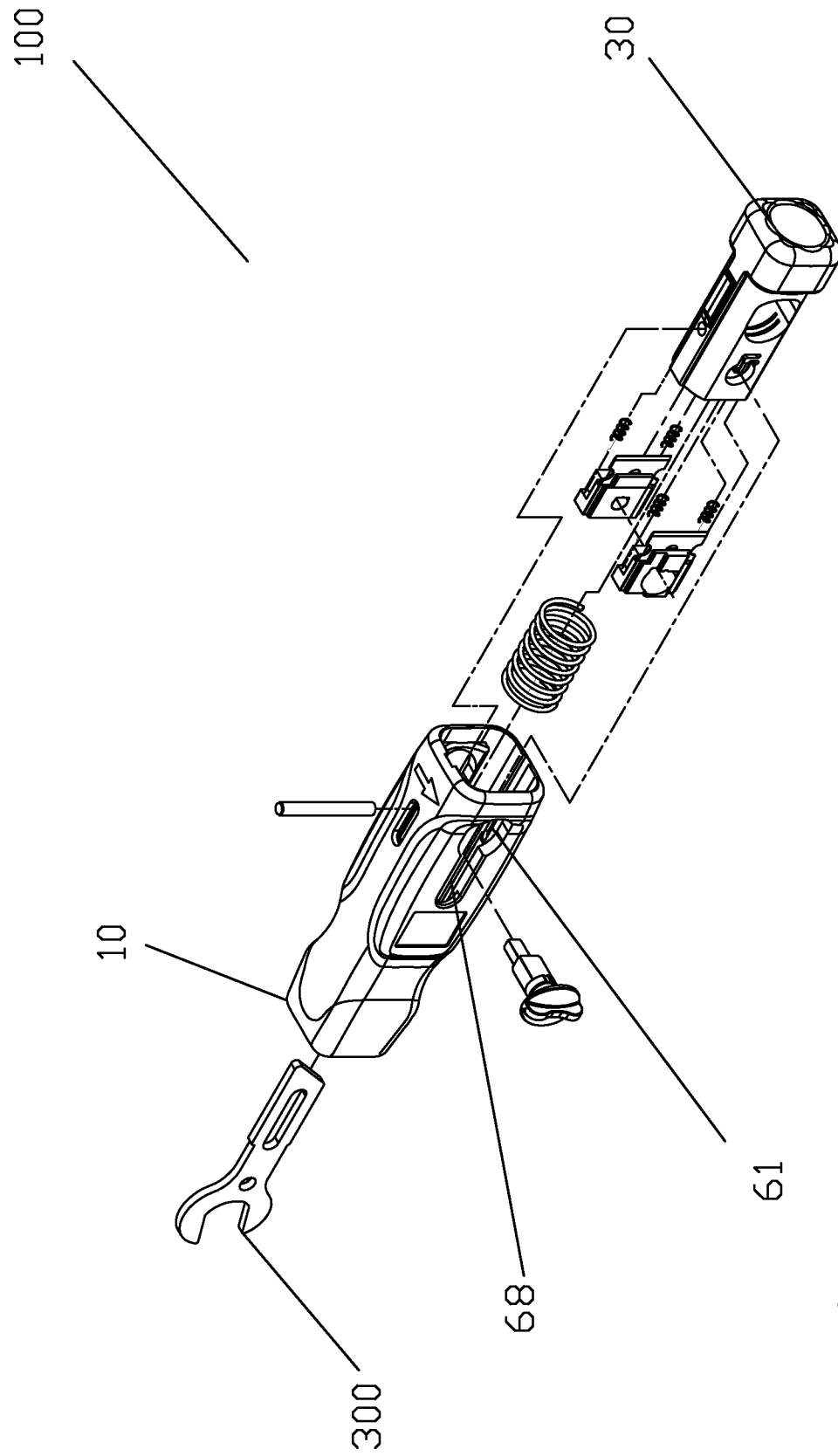
FIG. 24 is an exploded view of another version of the coaxial cable stripper showing that first hole and the eighth hole are interconnected.
Figure 25:
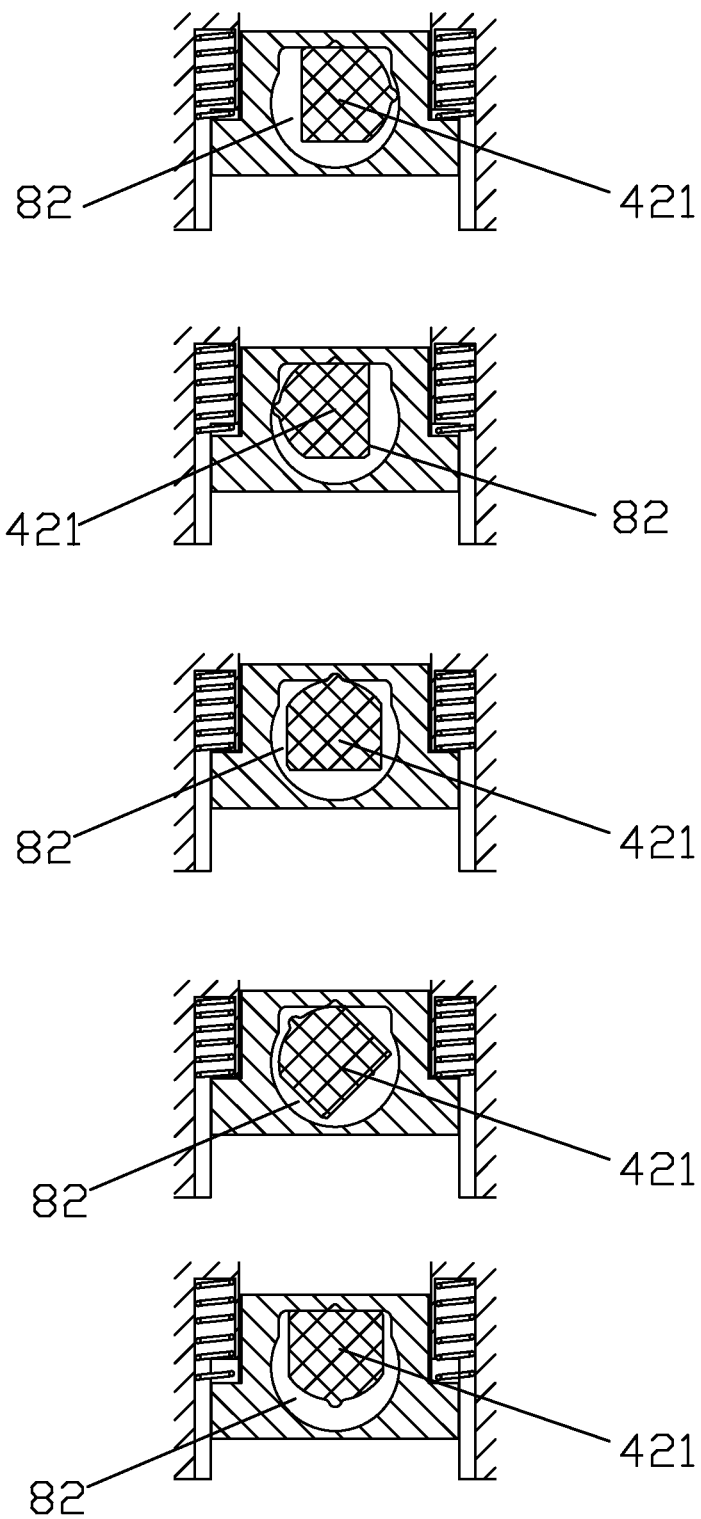
FIG. 25 shows how rotation of the second polygonal cylinder takes place inside the second polygonal hole, and how various edges of the second polygonal cylinder will push against the second polygonal hole during the rotation.
Figure 26:
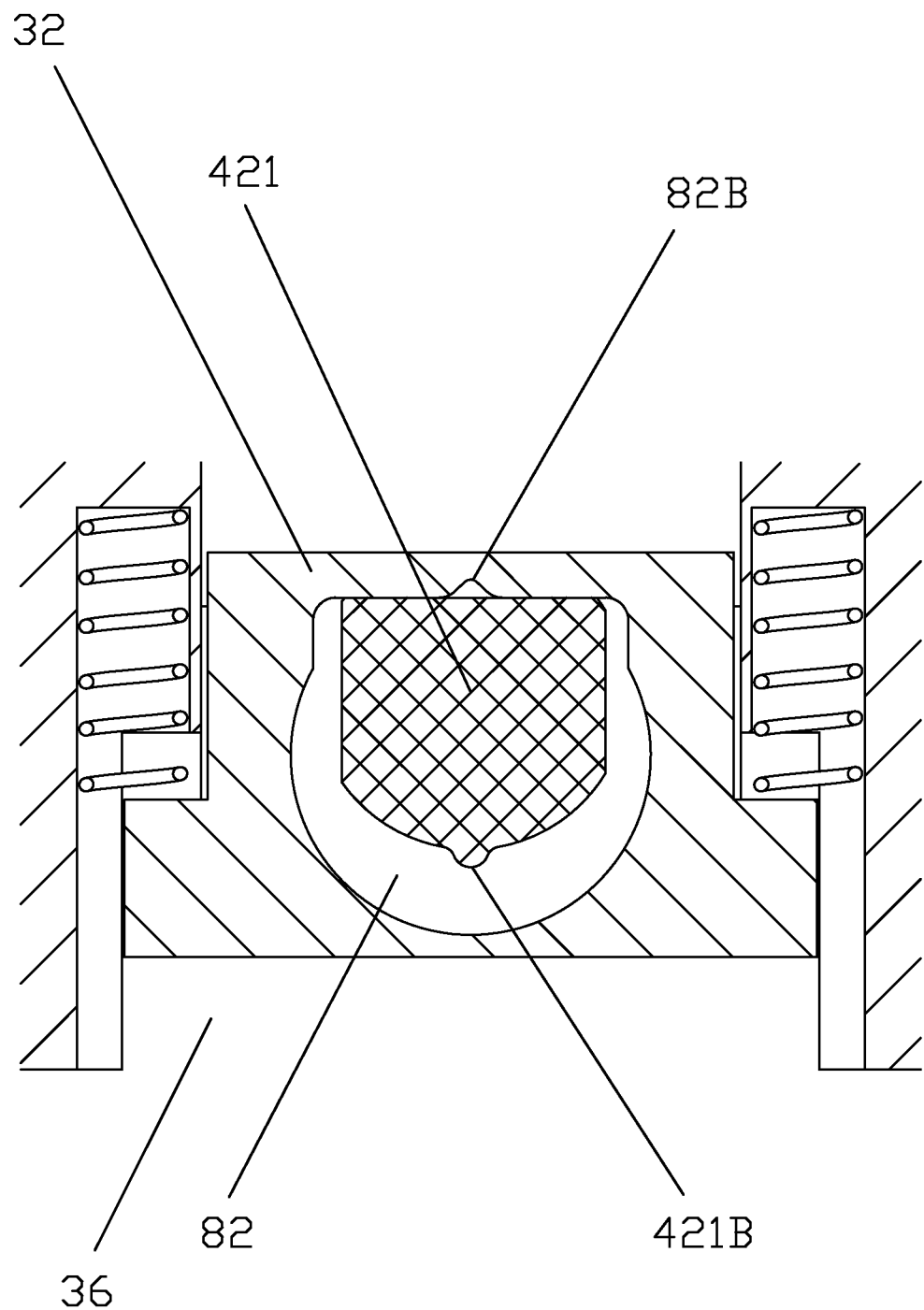
FIG. 26 shows the second flat surface of the second polygonal cylinder pushing against the second polygonal hole.
Figure 27:
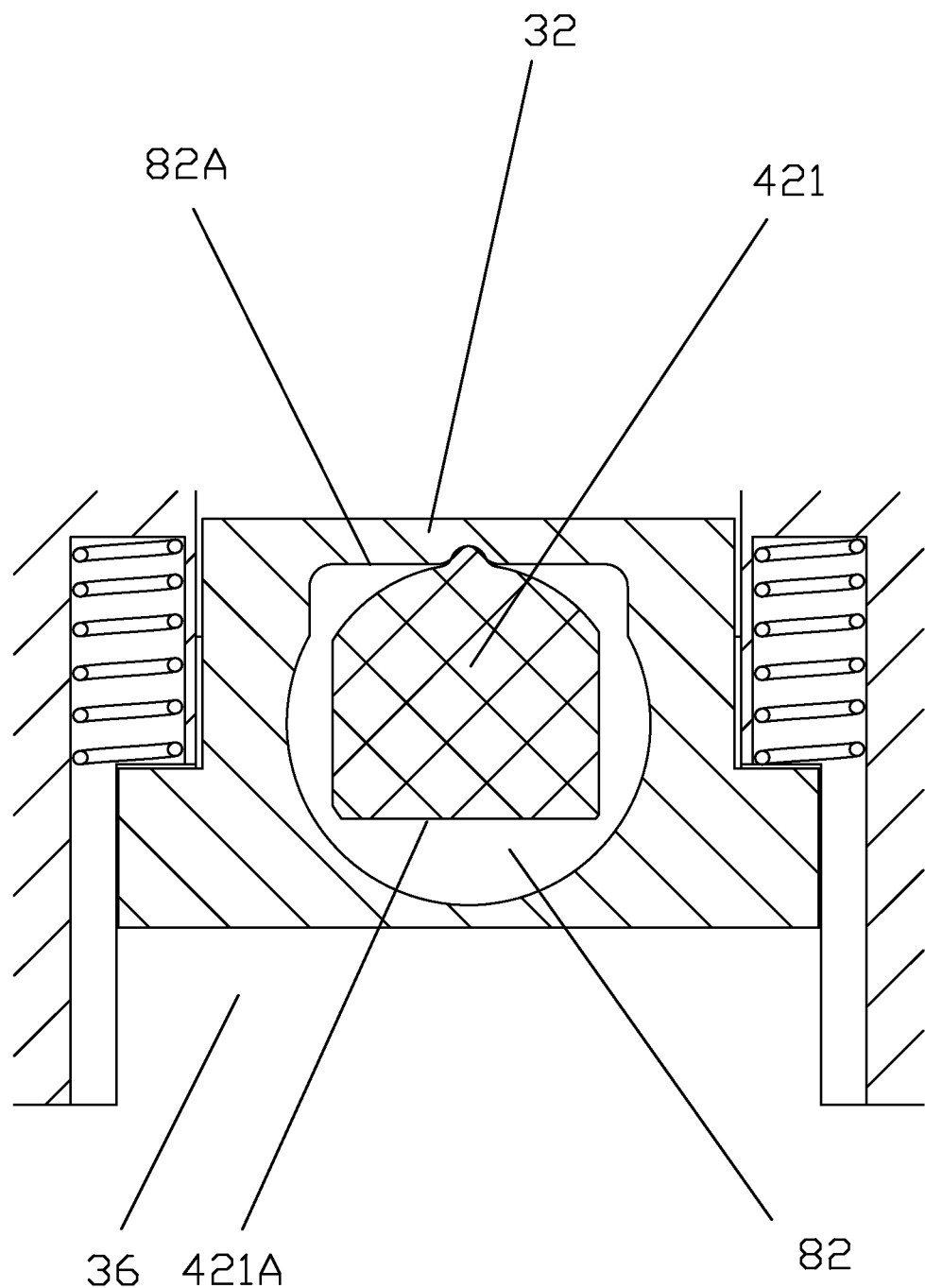
FIG. 27 shows the second protrusion of the second polygonal cylinder and how the second protrusion pushes against the second positioning slot.
Figure 28:
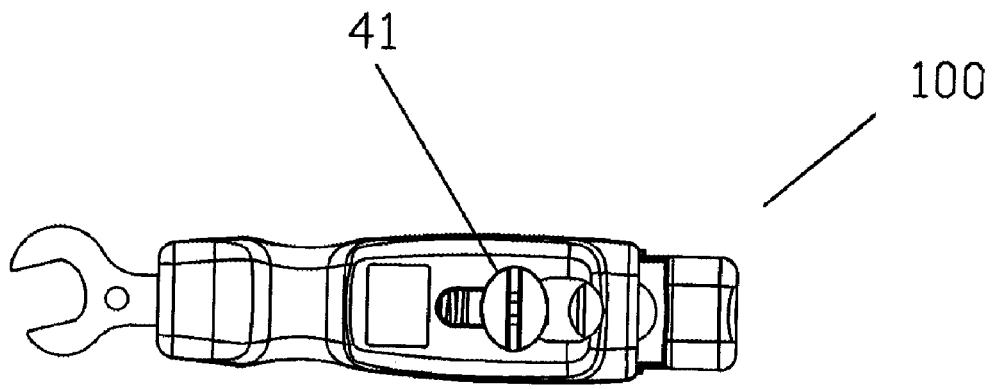
FIG. 28 is a top view of the coaxial cable stripper showing rotatable, displaceable part which is being set at 0 degree.
Figure 29:
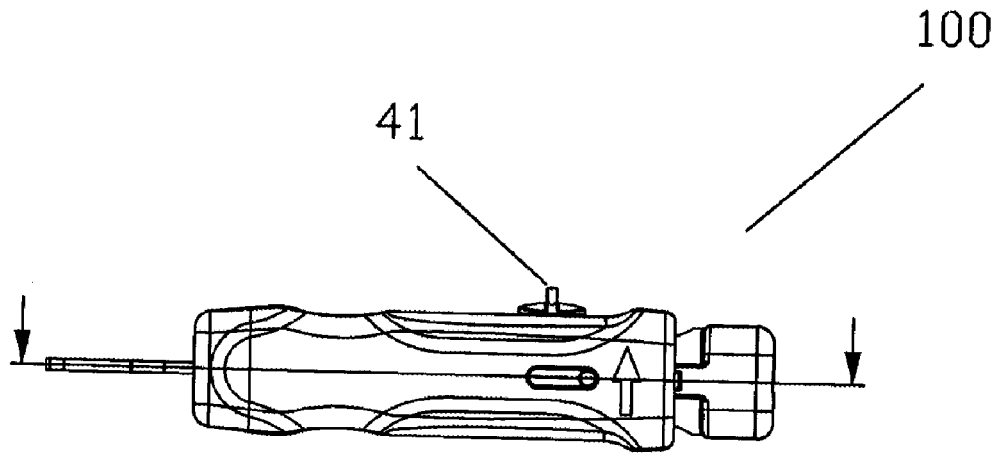
FIG. 29 is a cutaway view of the coaxial cable stripper as shown in FIG. 28.
Figure 30:
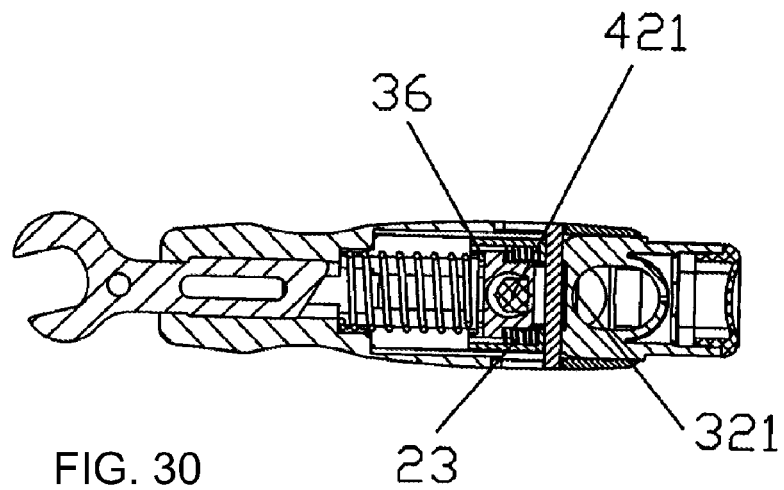
FIG. 30 is a cutaway view of the coaxial cable stripper as shown in FIG. 29 showing the second flat surface of second polygonal cylinder pushing against the fourth flat surface of the second polygonal hole, and how the second blade is protruded outside of the second gap.
Figure 31:
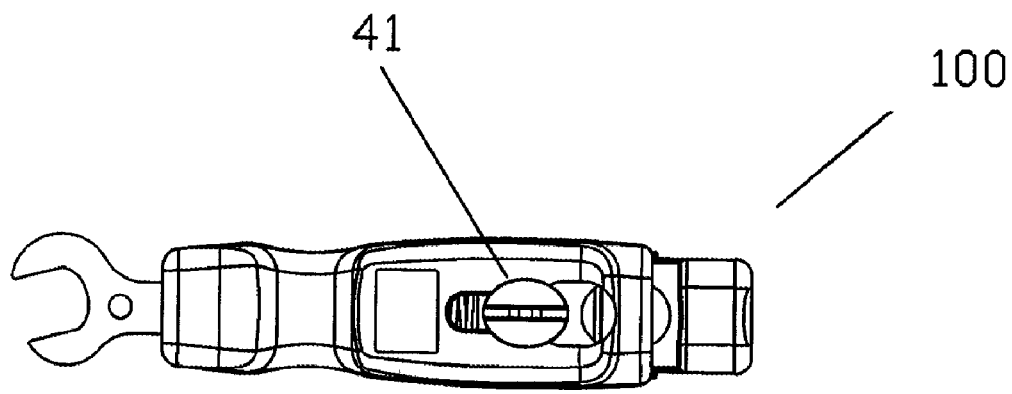
FIG. 31 is a top view of another version of the coaxial cable stripper showing the rotatable, displaceable part which is being set at 90 degree.
Figure 32:
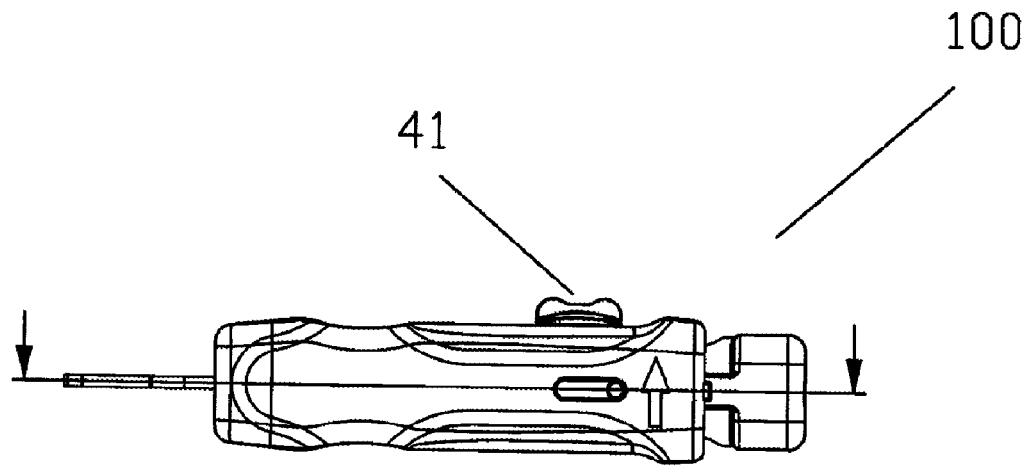
FIG. 32 is a cutaway view of the coaxial cable stripper as shown in FIG. 31.
Figure 33:
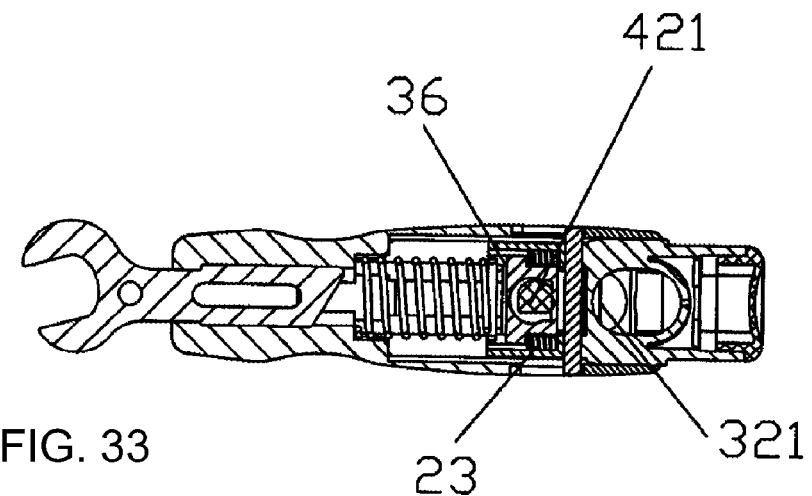
FIG. 33 is a cutaway view of FIG. 32 showing the other second flat surface of the second polygonal cylinder pushing against the fourth flat surface of the second polygonal hole, and the second blade protruding outside the second gap, also, the amount of protrusion shown in FIG. 33, made by second blade and second gap, is greater than what is in FIG. 30.
Figure 34:
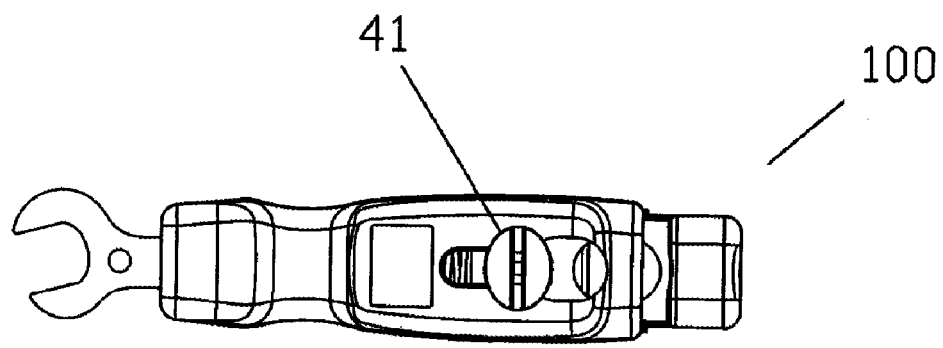
FIG. 34 is a top view of another version of the coaxial cable stripper showing the rotatable, displaceable part which is being set at 180 degree.
Figure 35:
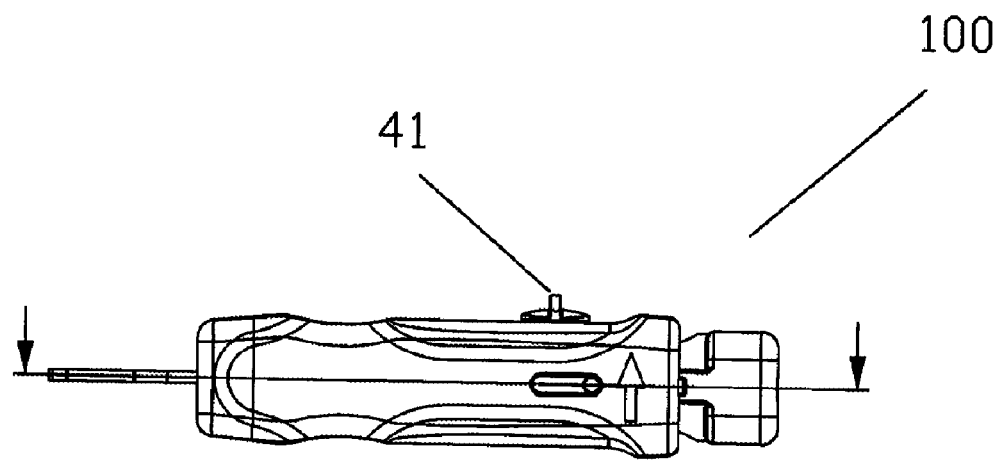
FIG. 35 is a side view of the coaxial cable stripper as shown in FIG. 34.
Figure 36:
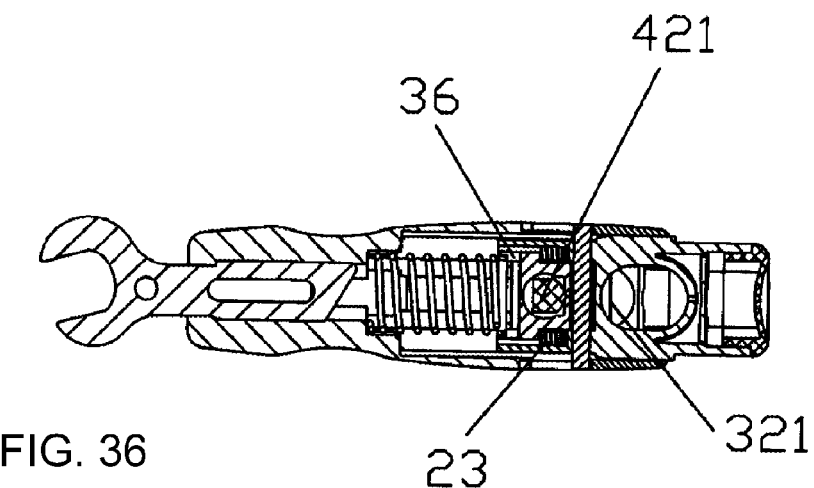
FIG. 36 is a cutaway view of the coaxial cable stripper as shown in FIG. 35 showing the second protrusion of the second polygonal cylinder positioned at the second positioning slot of the second polygonal hole and is pushing against the second polygonal hole, also the amount of protrusion shown in FIG. 36, made by second blade and first gap, is greater than what is in FIG. 30;'
Figure 38:
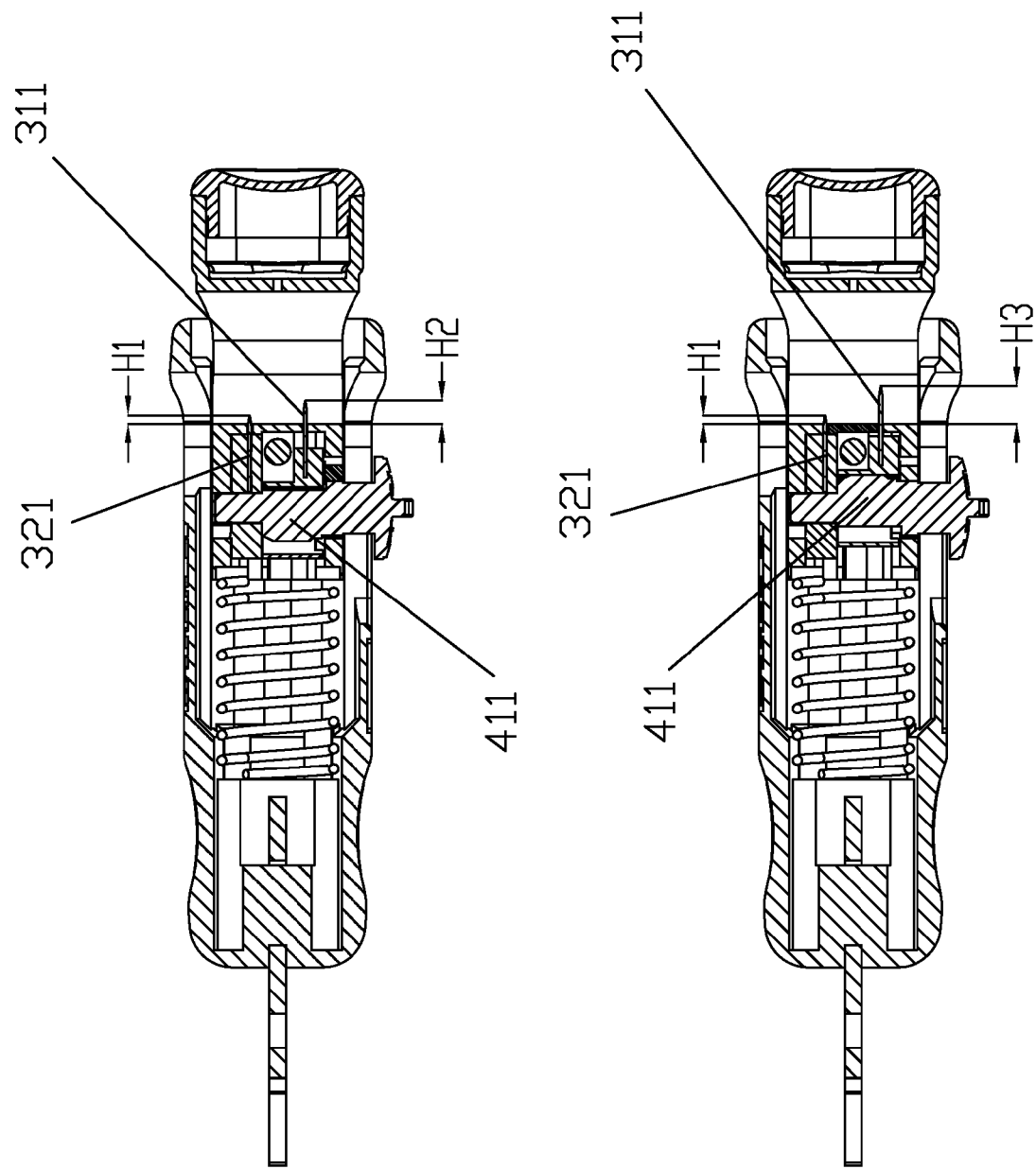
FIG. 38 shows the height difference between the first blade protruding the first gap and the second blade protruding the second gap, inside the coaxial cable stripper.
Figure 39:
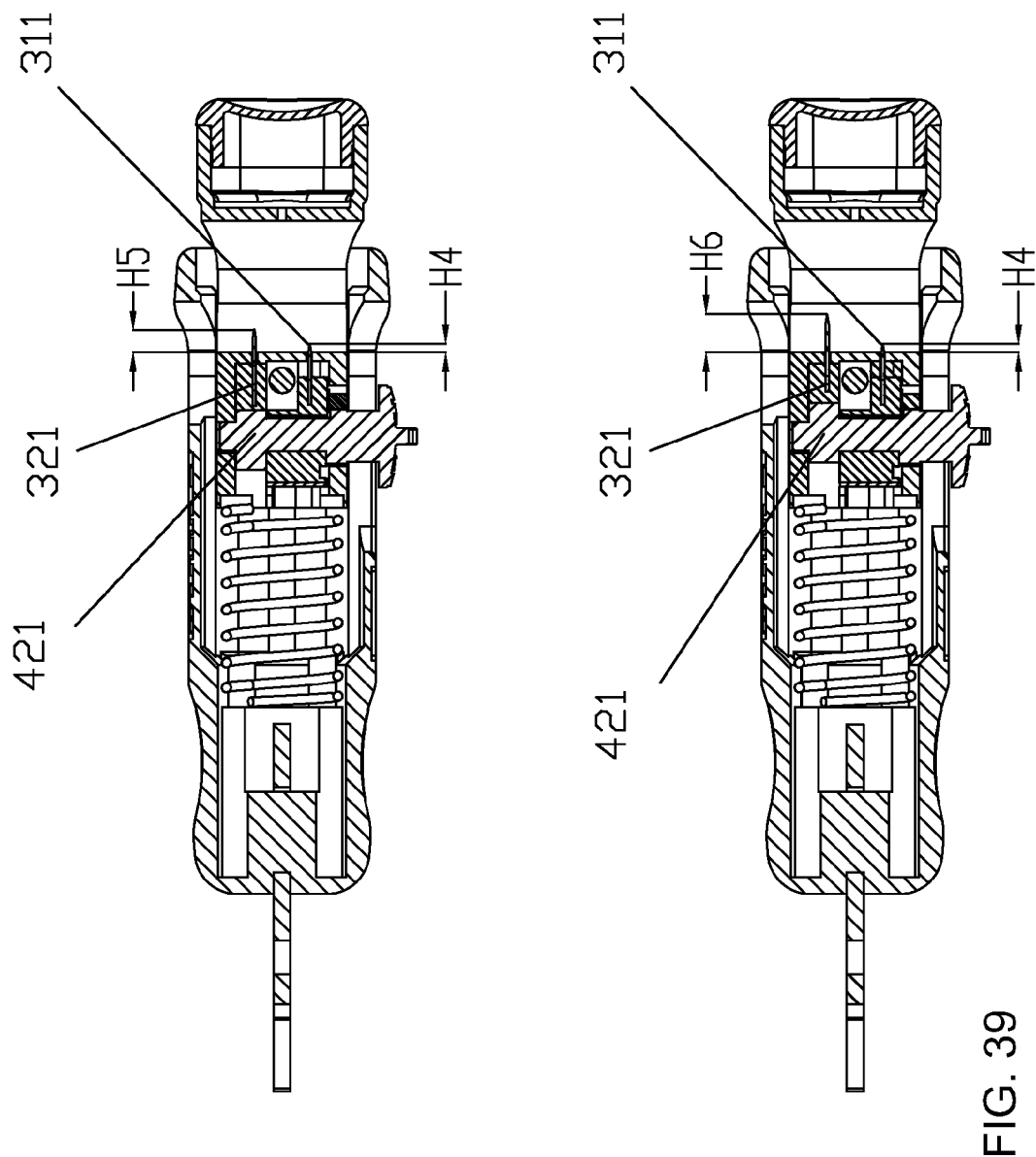
FIG. 39 shows the height made by the protruding first blade from the first gap, and the height made by the protruding second blade from the second gap.
Figure 40:
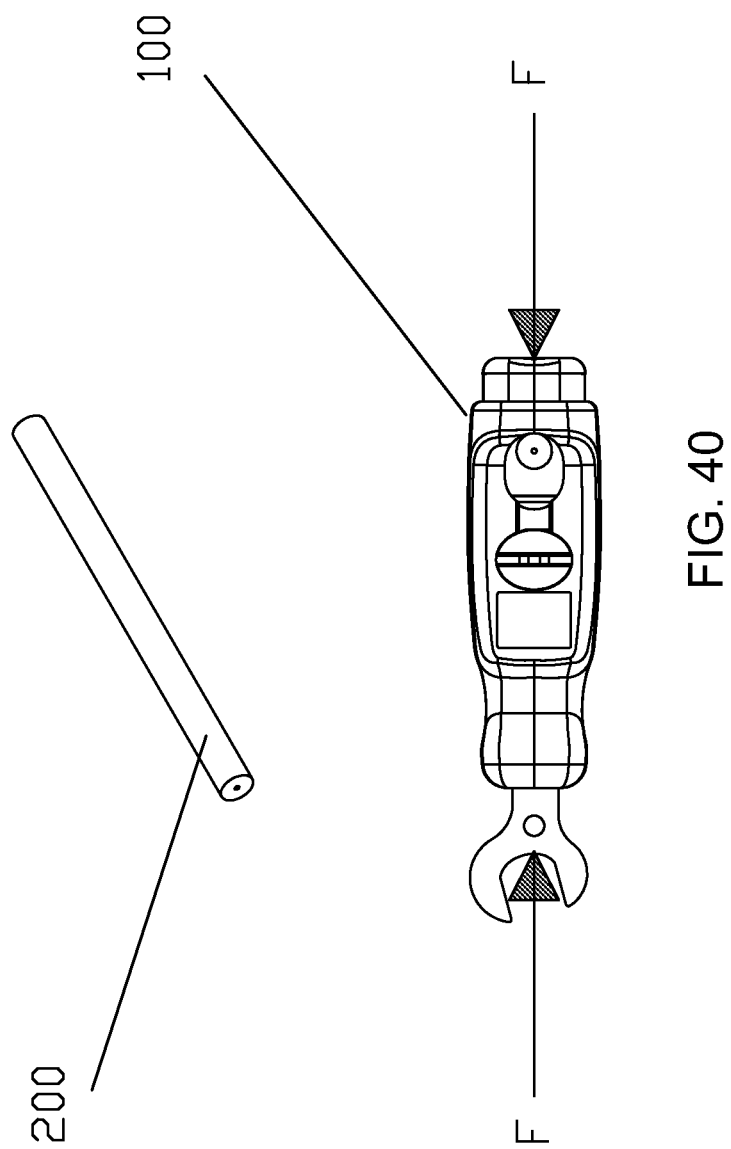
FIG. 40 shows how the coaxial cable can be placed within the coaxial cable stripper after thrust is applied.
Figure 41:
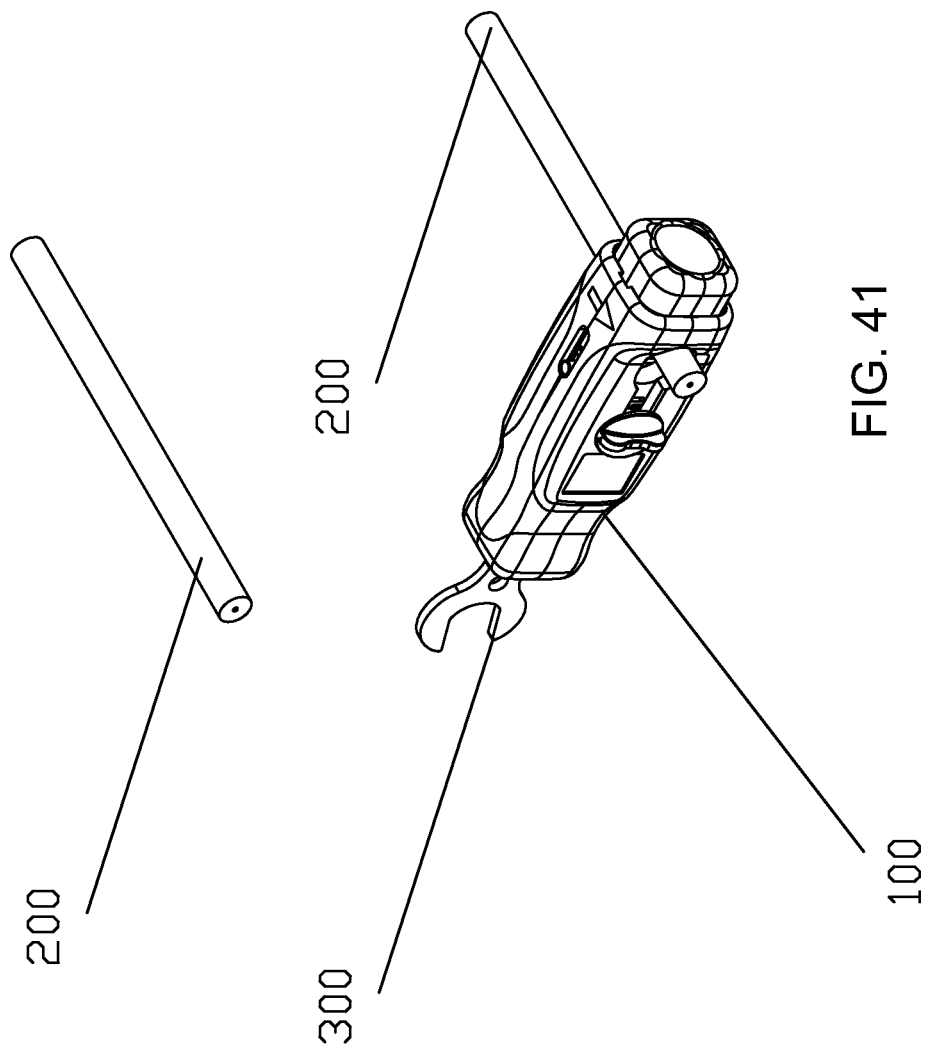
FIG. 41 shows how the coaxial cable is secured when thrust is removed from the coaxial cable stripper.
Figure 42:
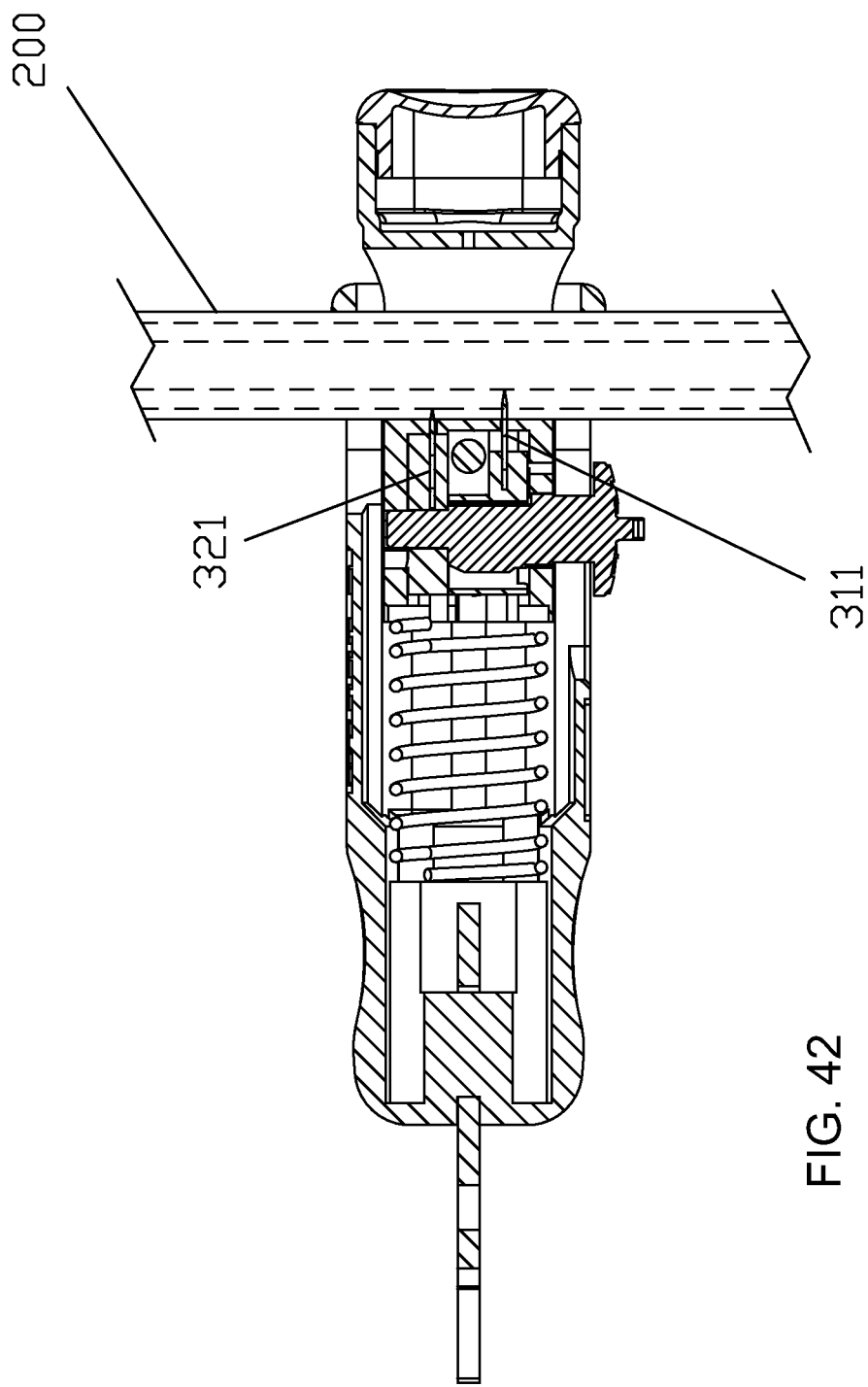
FIG. 42 is a cutaway view illustrating the coaxial cable is being secured and the first blade and the second blade cutting into the coaxial cable.
Figure 43:
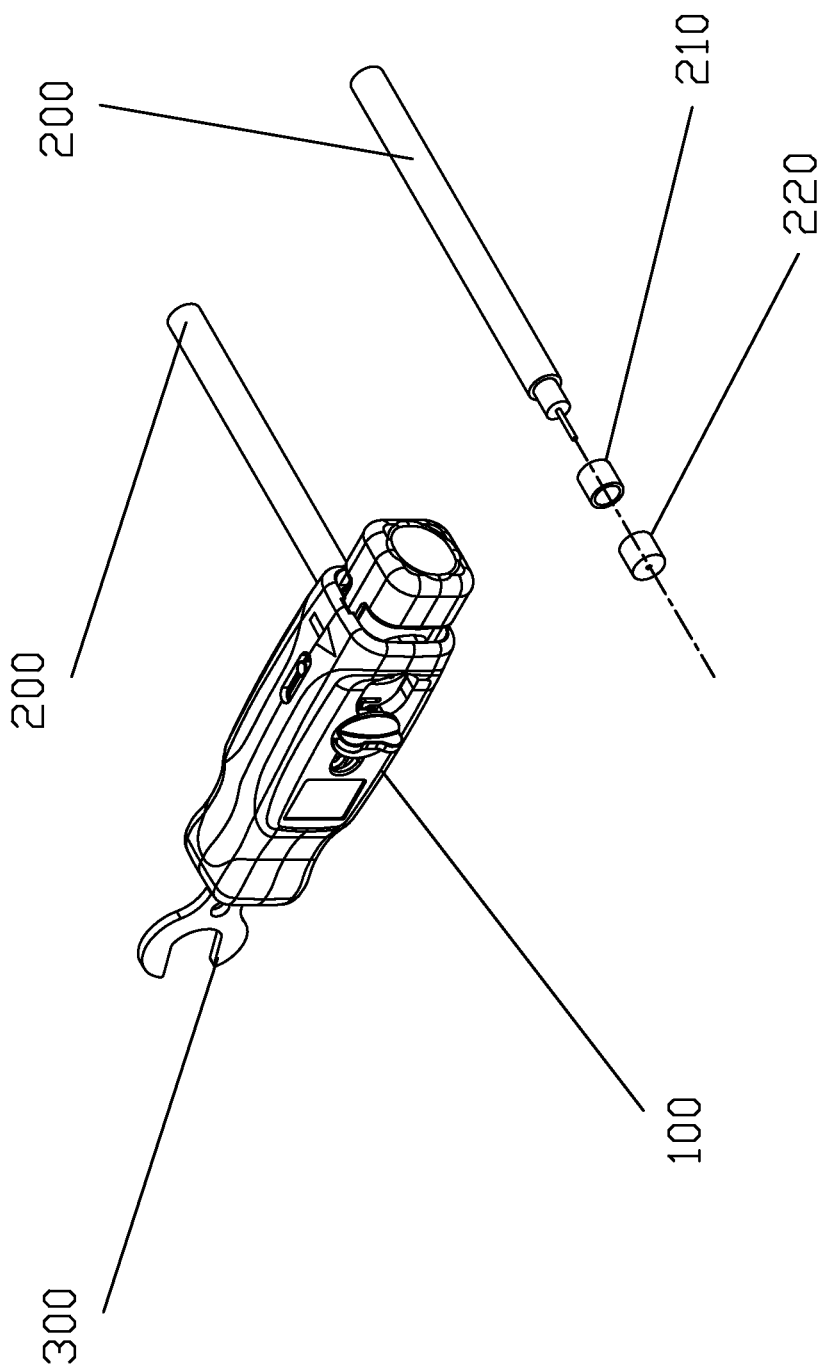
FIG. 43 shows both the first insulating layer and the second insulating layer that have been cut out by the coaxial cable stripper.

Referring to FIGS. 1 to 43, a coaxial cable stripper 100 in accordance with the invention comprises the following components as discussed in detail below.

The coaxial cable stripper 100 is applicable for cutting coaxial cables 200. The coaxial cable stripper 100 comprises a main body 10, a first spring 21, a shaft body 30, and a rotatable, displaceable part 40.

The main body 10 has a first hollow structure 11, one receptacle 12 is disposed at one end of the main body 10, the receptacle 12 is interconnected with the first hollow structure 11, a first guide hole 13 is disposed on one side of the receptacle 12, a second guide hole 14 is disposed on the other side of the receptacle 12, and a first hole 61 and an eighth hole 68 are disposed adjacent to the receptacle 12.

The first spring 21 is disposed within the first hollow structure 11; the shaft body 30 passes through the receptacle 12 and is placed within the first hollow structure 11, the first spring 21 is disposed between the shaft body 30 and the first hollow structure 11; moreover, the first spring 21 pushes the shaft body 30 and the first hollow structure 11, a through hole for rod 33 is disposed at the shaft body 30, a rod 50 first passes through the first guide hole 13 then passes through the through hole for rod 33 and finally enters into the second guide hole 14, a third hole 63 is disposed at the shaft body 30, a first gap A1 and a second gap A2 are disposed within the third hole 63, a fifth hole 65 is disposed at one side of the shaft body 30, a first blade guide groove 35 and a first blade seat 31 are disposed within the shaft body 30, a first blade 311 and a first polygonal hole 81 are disposed at the first blade seat 31, the first blade seat 31 is disposed at the first blade guide groove 35, moreover, the first blade seat 31 can move on the first blade guide groove 35, the first blade guide groove 35 leads the first blade 311 to displace on the first blade seat 31, the first blade 311 may protrude outside of the first gap A1, a second spring 22 is disposed within the shaft body 30, the second spring 22 is disposed between the first blade seat 31 and the shaft body 30, furthermore, the second spring 22 pushes simultaneously against the first blade seat 31 and the shaft body 30, a second blade 321 is disposed at the shaft body 30 and the second blade 321 may protrude outside of the second gap A2.

An extension 41 is disposed at the rotatable, displaceable part 40, a first polygonal cylinder 411 is disposed at the extension 41, the first polygonal cylinder 411 can rotate inside the first polygonal hole 81, the extension 41 passes first through the eighth hole 68 then through the fifth hole 65 and finally into the first polygonal hole 81.

Thus, rotation made by rotatable, displaceable part 40 leads the first polygonal cylinder 411 to rotate inside the second polygonal hole 81, the first polygonal cylinder 411 provides adjustments to various edges of the first polygonal cylinder 411 which push against the first polygonal hole 411, subsequently leading the first blade seat 31 to displace along the first blade guide groove 35, hence, to adjust the height of the first blade 311 at the second blade seat 31 that protrudes outside of the second gap A1.

When a thrust F is applied to the shaft body 30 of the coaxial cable stripper 100, the thrust F will compress the first spring 21. The guidance of the first guide hole 13 and the second guide hole 14 along the rod 50 causes the shaft body 30 to displace towards the direction of the hollow structure 11 rotatable, displaceable part 40 will also move at the eighth hole 68; hence, the movement leads the third hole 63 to displace towards the hollow structure 11. A coaxial cable 200 can be placed within the third hole 63 of the coaxial cable stripper 100 once the third hole 63 overlaps with the first hole 61.

Stress at the shaft body 30 is relieved once thrust F is removed. When that happens, the first spring 21 will be automatically trending back to its original position. In addition, the shaft body 30 will be guided by the first guide hole 13 and the second guide hole 14 at the rod 50 and be pushed away from the hollow structure 11; moreover, the blockage from the rod 50 will not allow the shaft body 30 and the hollow structure 11 to completely separate. At this moment, the coaxial cable 200 being placed in the third hole 63 will be clamped tightly inside the third hole 63 while the first blade 311 and the second blade 321 will make their cuts into the coaxial cable 200.

After the coaxial cable 200 is securely held and follow by rotating the coaxial cable stripper 100, the first blade 311 and the second blade 321 will cut the first insulating layer 210 and/or the second insulating layer 220 off of the coaxial cable 200 or secure the coaxial cable stripper 100 and follow by rotating the coaxial cable 200, the first blade 311 and the second blade 321 will cut the first insulating layer 210 and/or second insulating layer 220 off of the coaxial cable 200.

Also in this example, the first hole 61 and the eighth hole 68 are interconnected; hence, the rotatable, displaceable part 40 is allowed to rotate and/or move while inside the first hole 61 and the eighth hole 68.

Also in this example, the other side of the receptacle 12 has the second hole 62, the second hole 62 is interconnected with the first hole 61; hence, the coaxial cable 200 is allowed to be placed within the second hole 62 and the first hole 61.

Also in this example, the shaft body 30 comprises: the second blade seat 32 at where the second blade 321 and a fourth hole 64 are installed, wherein the extension 41 passes through the eighth hole 68, then passes through the fifth hole 65, then passes first polygonal hole 81, then finally into the fourth hole 64.

Also in this example, the shaft body 30 comprises a seventh hole 67, wherein the extension passes through the eight hole 68, then passes through the fifth hole 65, then passes through the first polygonal hole 81, then passes through the fourth hole 64, then finally into the seventh hole 67.

Also in this example, first polygonal hole 81 comprises a third flat surface 81A. The first polygonal cylinder 411 comprises a first flat surface 411A. When the first polygonal cylinder 411A is rotated, the first flat surface 411A pushes against the third flat surface 81A. Through the rotation of the rotatable, displaceable part 40, the first polygonal cylinder 411 is driven to rotate inside the first polygonal hole 81. The first flat surface 411A pushes the third flat surface 81A, which leads the first blade seat 31 to displace at the first blade guide groove 35; hence, resulting in making adjustment to the height of the first blade 311 at the first blade seat 31 that protrudes outside of the first gap A1.

Also in this example, the first polygonal hole 81 comprises a first positioning slot 81B. The first polygonal cylinder 411 comprises a first protrusion 411B. When the first polygonal cylinder 411 rotates, the first protrusion 411B can be positioned inside the first positioning slot 81B and pushes against the first positioning slot 81B. Through the rotation of the rotatable, displaceable part 40, the first polygonal cylinder 411 is driven to rotate inside the first polygonal hole 81. The first protrusion 411B can be positioned inside the first positioning slot 81B and pushes against the first positioning slot 81B, leading the first blade seat 31 at the first blade guide groove 35 to displace; hence, allowing the adjustment of the height of the first blade 311 at the first blade seat 31 that protrudes outside of the first gap A1.

Also in this example, extension 41 comprises a groove 42 which is lodged at the eighth hole 68; hence, the rotatable, displaceable part 40 can move and rotate at the eighth hole 68, the rotatable, displaceable part 40 can rotate at the eighth hole 68, or the rotatable, displaceable part 40 can move at the eighth hole 68.

Also in this example, the shaft body 30 comprises a second blade seat 32 at which the second blade 321 and the second polygonal hole are disposed, furthermore, the second blade seat 32 is disposed at the second blade guide groove 36 and is also movable along the second blade guide groove 36 which guides the displacement of second blade 321 on the second blade seat 32; a third spring 23 is installed between the second blade seat 32 and the shaft body 30 while simultaneously pushes the second blade seat 32 and the shaft body 30; the extension comprises: a second polygonal cylinder 421. The rotation of the rotatable, displaceable part 40 drives the second polygonal cylinder 421 to rotate inside the second polygonal hole 82 while adjusting various edges of the second polygonal cylinder 421 to push the second polygonal hole 82; moreover, the rotation of the rotatable, displaceable part 40 also drives the second blade seat 32 to displace on the second blade guide groove 36 in order to adjust the height of the second blade 321 of the second blade seat 32 that protrudes outside of the second gap A2.

Also in this example, extension 41 passes through the eighth hole 68, then passes through the fifth hole 65, then passes through the first polygonal hole 81, then finally into the second polygonal hole 82.

Also in the example, the shaft body 30 comprises a seventh hole 67. The extension passes through the eighth hole 68, then passes through the fifth hole 65, then passes first polygonal hole 81, then passes through the second polygonal hole 82, and finally into the seventh hole 67.

Also in this example, the second polygonal hole 82 comprises a fourth flat surface 82A. The second polygonal cylinder 421 comprises a second flat surface 421A. When the second polygonal cylinder 421 rotates, the second flat surface 421A can push against the fourth flat surface 82A. The rotation of the rotatable, displaceable part 40 drives the second polygonal cylinder 421 to rotate inside the second polygonal hole 82, while the second flat surface 421A push against the fourth flat surface 82A, the action drives the second blade seat 32 to displace along the second blade guide groove 36; hence, resulting in making adjustment to the height of the second blade 321 of the second blade seat 32 that protrudes outside of the second gap A2.

Also in this example, the second polygonal hole 82 comprises a second positioning slot 82B. The second polygonal cylinder 421 comprises a second protrusion 421B. When the second polygonal cylinder 421 rotates, the rotation causes the second protrusion 421B to position inside the second positioning slot 82B while pushing against the second positioning slot 82B; therefore, the rotation of the rotatable, displaceable part 40 drives the second polygonal cylinder 421 to rotate inside the second polygonal hole, moreover, the second protrusion can be positioned at inside the second positioning slot 82B and pushes against the second positioning slot 82B, and the rotation of the rotatable, displaceable part 40 also drives the second blade seat 32 to displace along the second blade guide groove 36; hence, resulting in making adjustment to the height of the second blade 321 of the second blade seat 32 that protrudes outside of the second gap A2.

Also in this example, a wrench is secured to the main body 10. The wrench 200 can be used to lock bolts.

Following is a description of first operations of the coaxial cable stripper 100:

The rotation of the rotatable, displaceable part 40 causes the extension to rotate, which drives the first polygonal cylinder 411 to rotate inside the first polygonal hole.

The rotation of the first polygonal cylinder 411 pushes the first polygonal hole 81 upward or downward, which causes the first blade seat 31 to displace along the first blade guide groove 35, which further pushes the first blade 311 of the first blade seat 31 upward or allows the first blade 311 of the first blade seat 31 to move downward; hence, resulting in making adjustment to the height of the first blade 311 which protrudes outside of the first gap A1 the second spring 22 of the shaft body 30 will simultaneously push against the first blade seat 31 and the shaft body 30.

Because the height of first blade 311 that protrudes outside the first gap A1 e.g., H2 or H3 is different from the height of the second blade 321 that protrudes outside the second gap A2 e.g., H1; therefore, two separate cuts having different depth can be made against the coaxial cable 200.

Since the shaft body 30 and the first spring 21 pushing against each other, when a thrust F is applied against the shaft body 30 of the coaxial cable stripper 100, the thrust F will compress the first spring 21, the shaft body 30 displaces towards the hollow structure 11 via the guidance of the first guide hole 13 and the second guide hole 14 the rotatable, displaceable part 40 will also move at the eighth hole 68;

hence, these movements leads the third hole 63 to displace toward the hollow structure 11, coaxial cable 200 can be placed within the third hold 63 of the coaxial cable stripper 100 once the third hole 63 and the first hole 61 overlap and lined up with each other.

Stress at the shaft body 30 is relieved once thrust F is removed, the first spring 21 will be automatically trending back to its original position, in addition, the shaft body 30 will be guided by the first guide hole 13 and the second guide hole 14 at the rod 50 and be pushed away from the hollow structure 11 the blockage from the rod 50 will not allow the shaft body 30 and the hollow structure 11 to completely separate At this moment, the coaxial cable 200 being placed in the third hole 63 will be clamped tightly inside the third hole 63 while the first blade 311 and the second blade 321 will make their cuts into the coaxial cable 200.

After the coaxial cable 200 is securely held and follow by rotating the coaxial cable stripper 100, the first blade 311 and the second blade 321 will cut the first insulating layer 210 and/or the second insulating layer 220 off of the coaxial cable 200 or secure the coaxial cable stripper 100 and follow by rotating the coaxial cable 200, the first blade 311 and the second blade 321 will cut the first insulating layer 210 and/or second insulating layer 220 off of the coaxial cable 200.

Following is a description of second operations of the coaxial cable stripper 100:

The rotation of extension 41 of the rotatable, displaceable part 40 causes the second polygonal cylinder to rotate inside the second polygonal hole 82.

The rotation of the second polygonal cylinder 421 pushes the second polygonal hole 82 upward or downward, which causes the second blade seat 32 to displace along the second blade guide groove 36, which further pushes the second blade 321 of the second blade seat 32 upward or allows the second blade 321 of the second blade seat 32 to move downward; hence, resulting in making adjustment to the height of the second blade 321 which protrudes outside of the second gap A2 the third spring 23 of the shaft body 30 will simultaneously push against the second blade seat 32 and the shaft body 30.

Because the height of second blade 321 that protrudes outside the second gap A2 e.g., H5 or H6 is different from the height of the first blade 311 that protrudes outside the first gap A1 e.g., H4; therefore, two separate cuts having different depth can be made against the coaxial cable 200.

Since the shaft body 30 and the first spring 21 pushing against each other, when a thrust F is applied against the shaft body 30 of the coaxial cable stripper 100, the thrust F will compress the first spring 21, the shaft body 30 displaces towards the hollow structure 11 via the guidance of the first guide hole 13 and the second guide hole 14 the rotatable, displaceable part 40 will also move at the eighth hole 68; hence, these movements leads the third hole 63 to displace toward the hollow structure 11, coaxial cable 200 can be placed within the third hold 63 of the coaxial cable stripper 100 once the third hole 63 and the first hole 61 overlap and lined up with each other.

Stress at the shaft body 30 is relieved once thrust F is removed, the first spring 21 will be automatically trending back to its original position, in addition, the shaft body 30 will be guided by the first guide hole 13 and the second guide hole 14 at the rod 50 and be pushed away from the hollow structure 11 the blockage from the rod 50 will not allow the shaft body 30 and the hollow structure 11 to completely separate. At this moment, the coaxial cable 200 being placed in the third hole 63 will be clamped tightly inside the third hole 63 while the first blade 311 and the second blade 321 will make their cuts into the coaxial cable 200.

After the coaxial cable 200 is securely held and follow by rotating the coaxial cable stripper 100, the first blade 311 and the second blade 321 will cut the first insulating layer 210 and/or the second insulating layer 220 off of the coaxial cable 200 or secure the coaxial cable stripper 100 and follow by rotating the coaxial cable 200, the first blade 311 and the second blade 321 will cut the first insulating layer 210 and/or second insulating layer 220 off of the coaxial cable 200.

Following is a description of third operations of the coaxial cable stripper 100:

The rotation of the rotatable, displaceable part 40 drives the extension 41 to rotate. The rotation of the extension 41 will result in the rotation of the first polygonal cylinder 411 to rotate inside the first polygonal hole 81; the rotation of the first polygonal cylinder 411 to rotate inside the first polygonal hole 81.

The rotation of the first polygonal cylinder 411 and the rotation of the second polygonal cylinder 421 will result in the rotation of the first polygonal cylinder 411 pushes the first polygonal hole 81 upward or downward, which causes the first blade seat 31 to displace along the first blade guide groove 35, which further pushes the first blade 311 of the first blade seat 31 upward or allows the first blade 311 of the first blade seat 31 to move downward; hence, resulting in making adjustment to the height of the first blade 311 which protrudes outside of the first gap A1 the second spring 22 of the shaft body 30 will simultaneously push against the first blade seat 31 and the shaft body 30.

The rotation of the second polygonal cylinder 421 pushes the second polygonal hole 82 upward or downward, which causes the second blade seat 32 to displace along the second blade guide groove 36, which further pushes the second blade 321 of the second blade seat 32 upward or allows the second blade 321 of the second blade seat 32 to move downward; hence, resulting in making adjustment to the height of the second blade 321 which protrudes outside of the second gap A2 the third spring 23 of the shaft body 30 will simultaneously push against the second blade seat 32 and the shaft body 30.

The reasons why two different cuts have different depths can be made to coaxial cable are below. The height of the first blade 311 that protrudes outside of the first gap A1 for example: H2 or H3 is different from the height of the second blade 321 that protrudes outside of the second gap A2 for example: H1; or the height of the second blade 321 that protrudes outsides of the second gap A2 for example: H5 or H6 is different from the height of the first blade 311 that protrudes outsides of the first gap A1 for example: H4.

Since the shaft body 30 and the first spring 21 pushing against each other, when a thrust F is applied against the shaft body 30 of the coaxial cable stripper 100, the thrust F will compress the first spring 21, the shaft body 30 displaces towards the hollow structure 11 via the guidance of the first guide hole 13 and the second guide hole 14 the rotatable, displaceable part 40 will also move at the eighth hole 68; hence, these movements leads the third hole 63 to displace toward the hollow structure 11, coaxial cable 200 can be placed within the third hold 63 of the coaxial cable stripper 100 once the third hole 63 and the first hole 61 overlap and lined up with each other.

Stress at the shaft body 30 is relieved once thrust F is removed, the first spring 21 will be automatically trending back to its original position, in addition, the shaft body 30 will be guided by the first guide hole 13 and the second guide hole 14 at the rod 50 and be pushed away from the hollow structure 11 the blockage from the rod 50 will not allow the shaft body 30 and the hollow structure 11 to completely separate. At this moment, the coaxial cable 200 being placed in the third hole 63 will be clamped tightly inside the third hole 63 while the first blade 311 and the second blade 321 will make their cuts into the coaxial cable 200.

After the coaxial cable 200 is securely held and follow by rotating the coaxial cable stripper 100, the first blade 311 and the second blade 321 will cut the first insulating layer 210 and/or the second insulating layer 220 off of the coaxial cable 200 or secure the coaxial cable stripper 100 and follow by rotating the coaxial cable 200, the first blade 311 and the second blade 321 will cut the first insulating layer 210 and/or second insulating layer 220 off of the coaxial cable 200.

While the invention has been described in terms of preferred embodiments, those skilled in the art will recognize that the invention can be practiced with modifications within the spirit and scope of the appended claims.

What is claimed is:

1. A coaxial cable stripper comprising:
a main body;
a first spring;
a shaft body; and
a rotatable, displaceable part;
wherein the main body comprises a first hollow structure, a receptacle is disposed at one end of the main body, the receptacle connected to the first hollow structure, a first guide hole is disposed on one side of the receptacle, a second guide hole is disposed on the other side of the receptacle, and a first hole and an eighth hole are disposed adjacent to the receptacle;
wherein the first spring is disposed within the first hollow structure;
wherein the shaft body passes through the receptacle and is placed within the first hollow structure, the first spring is disposed between the shaft body and the first hollow structure, the first spring pushes the shaft body and the first hollow structure, a through hole for rod is disposed at the shaft body, a rod passes through the first guide hole and the through hole for rod and enters into the second guide hole, a third hole is disposed at the shaft body, and a first gap and a second gap are disposed within the third hole, a fifth hole is disposed at one side of the shaft body, a first blade guide groove and a first blade seat are disposed within the shaft body, a first blade and a first polygonal hole are disposed at the first blade seat, the first blade seat is disposed at the first blade guide groove, the first blade seat moves on the first blade guide groove, the first blade guide groove leads the first blade to displace on the first blade seat, the first blade protrudes out of the first gap, a second spring is disposed within the shaft body, the second spring is disposed between the first blade seat and the shaft body, the second spring pushes simultaneously against the first blade seat and the shaft body, a second blade is disposed at the shaft body, and the second blade protrudes out of the second gap; and
wherein the rotatable, displaceable part comprises an extension passing through the eighth hole and the fifth hole into the first polygonal hole, the extension including a first polygonal cylinder rotating in the first polygonal hole.

2. The coaxial cable stripper of claim 1, wherein the first hole and the eighth hole are interconnected.

3. The coaxial cable stripper of claim 2, wherein the other side of the receptacle has the second hole, the second hole connected to the first hole.

4. The coaxial cable stripper of claim 3, wherein the shaft body comprises the second blade seat at where the second blade and a fourth hole are installed, and wherein the extension passes through the eighth hole, the fifth hole, and the first polygonal hole into the fourth hole.

5. The coaxial cable stripper of claim 4, wherein the shaft body comprises a seventh hole, and wherein the extension passes through the eight hole, the fifth hole, the first polygonal hole, and the fourth hole into the seventh hole.

6. The coaxial cable stripper of claim 5, wherein the first polygonal hole comprises a third flat surface, wherein the first polygonal cylinder comprises a first flat surface, and wherein when the first polygonal cylinder is rotated, and the first flat surface pushes against the third flat surface.

7. The coaxial cable stripper of claim 6, wherein the extension comprises a groove which is lodged at the eighth hole, and wherein the rotatable, displaceable part moves and rotates at the eighth hole, the rotatable, displaceable part rotates at the eighth hole, or the rotatable, displaceable part moves at the eighth hole.

8. The coaxial cable stripper of claim 7, wherein a wrench is secured to the main body.

9. The coaxial cable stripper of claim 5, wherein the first polygonal hole comprises a first positioning slot, wherein the first polygonal cylinder comprises a first protrusion, and wherein when the first polygonal cylinder rotates, the first protrusion is positioned within the first positioning slot and pushes against the first positioning slot.

10. The coaxial cable stripper of claim 9, wherein the extension comprises a groove which is lodged at the eighth hole; wherein the rotatable, displaceable part moves and rotates at the eighth hole, the rotatable, displaceable part rotates at the eighth hole, or the rotatable, displaceable part moves at the eighth hole.

11. The coaxial cable stripper of claim 10, wherein a wrench is secured to the main body.

12. The coaxial cable stripper of claim 3, wherein the shaft body comprises a second blade seat at which the second blade and the second polygonal hole are disposed, the second blade seat is disposed at the second blade guide groove and is movable along the second blade guide groove which guides the displacement of second blade on the second blade seat; wherein a third spring is installed between the second blade seat and the shaft body while simultaneously pushes the second blade seat and the shaft body; and wherein the extension comprises a second polygonal cylinder.

13. The coaxial cable stripper of claim 12, wherein the extension passes through the eighth hole, the fifth hole, and the first polygonal hole into the second polygonal hole.

14. The coaxial cable stripper of claim 13, wherein the shaft body comprises a seventh hole, and wherein the extension passes through the eighth hole, the fifth hole, the first polygonal hole, and the second polygonal hole into the seventh hole.

15. The coaxial cable stripper of claim 14, wherein the second polygonal hole comprises a fourth flat surface, wherein the second polygonal cylinder comprises a second flat surface, and wherein when the second polygonal cylinder rotates, the second flat surface pushes against the fourth flat surface.

16. The coaxial cable stripper of claim 15, wherein the extension comprises a groove which is lodged at the eighth hole; and wherein the rotatable, displaceable part moves and rotates at the eighth hole, the rotatable, displaceable part rotates at the eighth hole, or the rotatable, displaceable part moves at the eighth hole.

17. The coaxial cable stripper of claim 16, wherein a wrench is secured to the main body.

18. The coaxial cable stripper of claim 14, wherein the second polygonal hole comprises a second positioning slot, wherein the second polygonal cylinder comprises a second protrusion, and wherein when the second polygonal cylinder rotates, the rotation causes the second protrusion to position within the second positioning slot while pushing against the second positioning slot.

19. The coaxial cable stripper of claim 18, wherein the extension comprises a groove which is lodged at the eighth hole; and wherein the rotatable, displaceable part moves and rotates at the eighth hole, the rotatable, displaceable part rotates at the eighth hole, or the rotatable, displaceable part moves at the eighth hole.

20. The coaxial cable stripper of claim 19, wherein a wrench is secured to the main body.

\* \* \* \* \*